(12) United States Patent
Chen et al.

(10) Patent No.: US 11,515,787 B2
(45) Date of Patent: Nov. 29, 2022

(54) REFERENCE VOLTAGE CONTROL IN A POWER SUPPLY

(71) Applicant: Infineon Technologies Austria AG, Villach (AT)

(72) Inventors: Keng Chen, Sudbury, MA (US); Luca Petruzzi, Andover, MA (US)

(73) Assignee: Infineon Technologies Austria AG, Villach (AT)

( * ) Notice: Subject to any disclaimer, the term of this patent is extended or adjusted under 35 U.S.C. 154(b) by 268 days.

(21) Appl. No.: 16/821,156

(22) Filed: Mar. 17, 2020

(65) Prior Publication Data

US 2020/0220448 A1 Jul. 9, 2020

Related U.S. Application Data

(63) Continuation of application No. 16/024,576, filed on Jun. 29, 2018, now Pat. No. 10,637,342.

(51) Int. Cl.
*H02M 3/156* (2006.01)
*H02M 3/158* (2006.01)
*H02M 1/00* (2006.01)

(52) U.S. Cl.
CPC ......... *H02M 3/156* (2013.01); *H02M 3/158* (2013.01); *H02M 1/0025* (2021.05)

(58) Field of Classification Search
CPC ...... H02M 3/158; H02M 3/157; H02M 3/156; H02M 1/00; H02M 1/0025
See application file for complete search history.

(56) References Cited

U.S. PATENT DOCUMENTS

| | | | |
|---|---|---|---|
| 4,160,981 | A | 7/1979 | Raney, Jr. |
| 5,600,234 | A | 2/1997 | Hastings |
| 6,066,943 | A | 5/2000 | Hastings |
| 6,518,738 | B1 | 2/2003 | Wang |
| 6,930,526 | B1 | 8/2005 | Silva |
| 7,764,057 | B2 | 7/2010 | Groom |
| 7,782,024 | B2 | 8/2010 | Fukushi |
| RE43,414 | E | 5/2012 | Walters |
| 8,183,848 | B2 | 5/2012 | Kuo |
| 8,217,636 | B2 | 7/2012 | Khayat |
| 8,896,284 | B2 | 11/2014 | Fan |
| 9,270,176 | B1 | 2/2016 | Nguyen et al. |
| 9,606,564 | B2 | 3/2017 | Agrawal |
| 2008/0049478 | A1 | 2/2008 | Wong et al. |
| 2009/0206808 | A1 | 8/2009 | Wrathall |
| 2009/0243580 | A1 | 10/2009 | Chen |

(Continued)

OTHER PUBLICATIONS

Kuang-Yao Cheng, et al., "Characterization and Performance Comparison of Digital V2-Type Constant on-Time Control for Buck Converters", Jun. 1, 2010, pp. 1-6, Control an Modeling for Power Electronics (Compel), 2010 IEEE 12th Workshop on.

(Continued)

*Primary Examiner* — Nguyen Tran
(74) *Attorney, Agent, or Firm* — Armis IP Law, LLC

(57) ABSTRACT

A power supply includes a reference voltage generator, a power supply phase, and an adjustor. During operation, the reference voltage generator produces a reference voltage. The power supply phase produces an output voltage to power a load as a function of an output voltage feedback signal derived from the output voltage and the reference voltage. The adjustor adjusts a magnitude of the reference voltage to maintain regulation of the output voltage with respect to a desired voltage setpoint.

33 Claims, 13 Drawing Sheets

(56) References Cited

U.S. PATENT DOCUMENTS

| | | |
|---|---|---|
| 2011/0316508 A1 | 12/2011 | Cheng et al. |
| 2012/0313603 A1 | 12/2012 | Ochoa |
| 2012/0326688 A1 | 12/2012 | Sun et al. |
| 2013/0038301 A1 | 2/2013 | Ouyang et al. |
| 2013/0038302 A1 | 2/2013 | Qian et al. |
| 2013/0128627 A1 | 5/2013 | Moon et al. |
| 2013/0141069 A1 | 6/2013 | Li |
| 2013/0187624 A1 | 7/2013 | Wakasugi |
| 2014/0091774 A1 | 4/2014 | Srinivasan et al. |
| 2014/0132236 A1 | 5/2014 | Darmawaskita et al. |
| 2014/0327423 A1 | 11/2014 | Lee et al. |
| 2014/0361687 A1 | 12/2014 | Olson et al. |
| 2015/0311798 A1 | 10/2015 | Yuan et al. |
| 2016/0006352 A1 | 1/2016 | Hang et al. |
| 2016/0067963 A1 | 3/2016 | Van Brocklin et al. |
| 2017/0155315 A1 | 6/2017 | Yasusaka |

OTHER PUBLICATIONS

Tian Shulin, et al., "Small-signal Mode Analysis and Design of Constant-on-time V2 Control for Low-ESR Caps with External Ramp Compensation" Sep. 17, 2011, pp. 2944-2951, Energy Conversion Congress and Exposition (ECCE), IEEE.

Tian Shuilin, et al., "A Three-Terminal Switch Model of Constant On-Time Current Mode with External Ramp Compensation", Oct. 1, 2016, pp. 7311-7319, IEEE Transactions on Power Electronics, vol. 31, No. 10.

Extended European Search Report, EP 18176183.4, dated Oct. 10, 2018, pp. 12.

Office Action, EP 19180518.3, dated Nov. 26, 2019, pp. 12.

REFERENCE VOLTAGE CONTROL IN A POWER SUPPLY

RELATED APPLICATION

This application is a continuation application of earlier filed U.S. patent application Ser. No. 16/024,576 entitled "REFERENCE VOLTAGE CONTROL IN A POWER SUPPLY," filed on Jun. 29, 2018, the entire teachings of which are incorporated herein by this reference.

BACKGROUND

Conventional power supplies may include one or more DC-to-DC converters to produce a respective output voltage to power a load. One type of DC-to-DC converter is a single-stage power converter system. As its name suggests, in the single-stage power converter system, each phase includes a single power converter to convert an input voltage such as 12 V DC (Volts Direct Current) into a respective target output voltage such as 1 volt DC to power a load.

One type of power converter is a buck converter. A so-called Constant ON Time (COT) switching buck regulator has a fixed ON-time and uses off-time Pulse Width Modulation (PWM) or frequency modulation to regulate an output voltage.

If desired, a conventional power converter can be configured to operate in a so-called diode emulation mode in which high side switch circuitry is occasionally pulse to an ON state to maintain regulation of an output voltage while corresponding low side switch circuitry is always disable (OFF). In general, to maintain an output voltage within a desired range, the buck converter compares the magnitude of a generated output voltage to control respective switch circuitry (such as a control switch and synchronous switch).

BRIEF DESCRIPTION

There are deficiencies associated with conventional techniques of producing an output voltage in a diode emulation mode. For example, it is typically more difficult to maintain an output voltage within (DC voltage) regulation while operating in a so-called diode emulation mode due to high ripple voltage present in the output voltage.

In contrast to conventional approaches, embodiments herein include novel ways of providing more accurate voltage regulation in a switching power supply during one or more operating conditions.

More specifically, in one embodiment, a power supply includes a reference voltage generator, a power supply phase, and an adjustor (a.k.a., adjustor circuitry or adjustor hardware). Typically, each of the power supply components as discussed herein such as the reference voltage generator, power supply phase, adjustor circuitry, etc., takes the form of a circuitry designed to that end. However, such resources can be instantiated in any suitable manner.

During operation, as its name suggests, the reference voltage generator produces a reference voltage. A controller controls the power supply phase to produce an output voltage to power a load as a function of an output voltage feedback signal derived from the output voltage and the reference voltage. If a magnitude of the output voltage falls outside an acceptable voltage range, the adjustor adjusts a magnitude of the reference voltage to maintain regulation of the output voltage with respect to a desired voltage setpoint.

In accordance with further embodiments, the power supply includes a monitor to produce an error voltage indicating a difference between the desired voltage setpoint and a current magnitude of the output voltage. In such an instance, the adjustor adjusts the magnitude of the reference voltage based on a magnitude of the error voltage. In one embodiment, the adjustment to the reference voltage causes the power supply to produce the output voltage in accordance with the desired voltage set point.

Note that as an alternative to measuring a magnitude of and nearness of the output voltage to the desired voltage set point, embodiments herein can include monitoring a ripple current associated with output voltage that delivers corresponding current to the load. For example, further embodiments herein include a monitor to detect a magnitude of ripple current delivered to the load via the output voltage. In such an instance, the adjustor is operable to adjust the magnitude of the reference voltage based on an amount of detected ripple current such that a magnitude (or average magnitude) of the output voltage is substantially equal to the desired voltage setpoint.

In accordance with further embodiments, the reference voltage is a floor reference voltage. The adjustor modifies the floor reference voltage to maintain the magnitude of the output voltage in accordance with a desired setpoint voltage. For example, in one embodiment, the adjustor is operable to reduce a magnitude of the floor reference voltage in response to detecting that a magnitude of the output voltage is greater than the desired voltage setpoint. Conversely, the adjustor is operable to increase a magnitude of the floor reference voltage in response to detecting that a magnitude of the output voltage is less than the desired voltage setpoint.

The power supply as discussed herein can be operated in any suitable mode. In one embodiment, the adjustor is operated in a respective diode emulation mode to adjust the magnitude of the reference voltage. The diode emulation mode is a mode in which high side switch circuitry (control switch circuitry) in the phase is occasionally pulsed to an ON state over multiple control cycles to maintain regulation of an output voltage while corresponding low side switch circuitry (synchronous switch circuitry) is always disable (OFF).

In accordance with still further embodiments, a respective phase of the power supply is operated in a constant ON-time mode in which high side switch circuitry in the phase is activated for a predetermined (such as fixed, same, etc) pulse time for each of multiple successive control cycles to produce the output voltage within a desired voltage range.

The output voltage may include a ripple voltage. That is, the magnitude of the output voltage may vary around an average DC output voltage value. Further embodiments herein include monitoring the output voltage to determine an average magnitude (such as RMS value) of the output voltage. The adjustor is operable to adjust the magnitude of the reference voltage such that the average magnitude of the output voltage is substantially equal to the desired voltage setpoint.

As previously discussed, the reference voltage can be a floor reference voltage. The power supply can be configured to further include a ramp voltage generator to produce a ramp voltage. The ramp voltage is offset with respect to the floor reference voltage. If desired, a magnitude of the offset ramp voltage signal is clamped to a predetermined voltage value. A phase controller compares a magnitude of the output voltage to the offset ramp voltage signal to determine when to activate high side switch circuitry in the phase such as in the constant ON-time, diode emulation control mode or any other suitable mode.

Note further that the adjustor can be configured to continuously adjust the reference voltage to maintain the output voltage. Alternatively, the adjustor can be configured to discontinue adjusting the magnitude of the reference voltage in response to detecting a condition in which an average magnitude of the output voltage is substantially equal to the desired voltage setpoint.

In accordance with further embodiments, the power supply can be configured to operate in a diode emulation mode. For example, in one embodiment, the reference voltage generator of the power supply produces a floor reference voltage. A phase in the power supply produces an output voltage to power a load as a function of an output voltage feedback signal derived from the output voltage and the floor reference voltage. The adjustor adjust a magnitude of the floor reference voltage to maintain regulation of the output voltage in accordance with a desired voltage setpoint during diode emulation mode of operating the phase to produce the output voltage In a similar manner as previously discussed, the adjustor can be configured to use any suitable power supply parameter as a basis to adjust the floor reference voltage. For example, in one embodiment, the adjustor adjusts the magnitude of the floor reference voltage depending on a received error voltage, the error voltage being a difference between the desired voltage setpoint and an average magnitude of the output voltage. In accordance with another embodiment, the adjustor adjusts the magnitude of the floor reference voltage depending on a magnitude of ripple current delivered to the load by the output voltage.

Further embodiments herein include a mode controller to switch between i) the diode emulation control mode in which the magnitude of the floor reference voltage is adjusted via the adjustor while in the diode emulation mode and ii) a continuous conduction mode in which a magnitude of the floor reference voltage varies depending on a magnitude of the output voltage with respect to the desired setpoint voltage.

The mode controller can be configured to switch between operating the phase in the i) the diode emulation control mode and ii) the continuous conduction mode based on an amount of power or current consumed by the load.

In still further embodiments, the power supply further comprises a ramp generator and a comparator. The ramp generator generates a ramp voltage signal, the ramp voltage signal being offset with respect to the floor reference voltage to produce an offset ramp voltage signal. The comparator compares the output voltage feedback signal to the offset ramp voltage signal to control the phase and corresponding magnitude of the output voltage.

Embodiments herein are useful over conventional techniques. For example, adjusting a magnitude of the reference voltage such as during a diode emulation mode provides better regulation of a generated output voltage.

These and other more specific embodiments are disclosed in more detail below.

Note that techniques as discussed herein can be implemented in any suitable environment such as multi-phase power supply applications, single phase point of load (a.k.a., POL) power supply applications, etc.

Note further that although embodiments as discussed herein are applicable to multi-phase power supply circuits such as those implementing buck converters, DC-DC converter phases, the concepts disclosed herein may be advantageously applied to any other suitable topologies as well as general power supply control applications.

Additionally, note that embodiments herein can include computer processor hardware (that executes corresponding software instructions) to carry out and/or support any or all of the method operations disclosed herein. In other words, any of one or more computerized devices or processors (computer processor hardware) can be programmed and/or configured to operate as explained herein to carry out different embodiments of the invention.

Yet other embodiments herein include software programs to perform the steps and operations summarized above and disclosed in detail below. One such embodiment comprises a computer program product that has non-transitory computer-storage media (e.g., memory, disk, flash, . . . ) including computer program instructions and/or logic encoded thereon that, when performed in a computerized device having a processor and corresponding memory, programs the processor to perform any of the operations disclosed herein. Such arrangements are typically provided as software instructions, code, and/or other data (e.g., data structures) arranged or encoded on a computer readable storage medium or non-transitory computer readable media such as an optical medium (e.g., CD-ROM), floppy or hard disk or other a medium such as firmware or microcode in one or more ROM or RAM or PROM chips, an Application Specific Integrated Circuit (ASIC), circuit logic, etc. The software or firmware or other such configurations can be installed onto a respective controller circuit to cause the controller circuit (such as logic) to perform the techniques explained herein.

Accordingly, one embodiment of the present disclosure is directed to a computer program product that includes a computer readable medium having instructions stored thereon for supporting operations such as controlling one or more phases in a power supply. For example, in one embodiment, the instructions, when carried out by computer processor hardware (one or more computer devices, control logic, digital circuitry, etc.), cause the computer processor hardware to: produce a reference voltage; via a power supply phase, produce an output voltage to power a load as a function of an output voltage feedback signal derived from the output voltage and the reference voltage; adjust a magnitude of the reference voltage to maintain regulation of the output voltage with respect to a desired voltage setpoint.

Another embodiment of the present disclosure is directed to a computer program product that includes a computer readable medium having instructions stored thereon for supporting operations such as controlling one or more phases in a power supply. For example, in one embodiment, the instructions, when carried out by computer processor hardware (one or more computer devices, control logic, digital circuitry, etc.), cause the computer processor hardware to: produce a floor reference voltage; operate a phase to produce an output voltage to power a load as a function of an output voltage feedback signal derived from the output voltage and the floor reference voltage; and adjust a magnitude of the floor reference voltage to maintain regulation of the output voltage in accordance with a desired voltage setpoint during a diode emulation mode of operating the phase to produce the output voltage.

The ordering of the operations has been added for clarity sake. The operations can be performed in any suitable order.

It is to be understood that the system, method, device, apparatus, logic, etc., as discussed herein can be embodied strictly as hardware (such as analog circuitry, digital circuitry, logic, etc.), as a hybrid of software and hardware, or as software alone such as within a processor, or within an operating system or a within a software application.

Note that although each of the different features, techniques, configurations, etc., herein may be discussed in different places of this disclosure, it is intended, where appropriate, that each of the concepts can optionally be executed independently of each other or in combination with each other. Accordingly, the one or more present inventions as described herein can be embodied and viewed in many different ways.

Also, note that this preliminary discussion of embodiments herein purposefully does not specify every embodiment and/or incrementally novel aspect of the present disclosure or claimed invention(s). Instead, this brief description only presents general embodiments and corresponding points of novelty over conventional techniques. For additional details and/or possible perspectives (permutations) of the invention(s), the reader is directed to the Detailed Description section and corresponding figures of the present disclosure as further discussed below.

BRIEF DESCRIPTION OF THE DRAWINGS

The foregoing and other objects, features, and advantages of the invention will be apparent from the following more particular description of preferred embodiments herein, as illustrated in the accompanying drawings in which like reference characters refer to the same parts throughout the different views. The drawings are not necessarily to scale, with emphasis instead being placed upon illustrating the embodiments, principles, concepts, etc.

DETAILED DESCRIPTION

Figure 1:
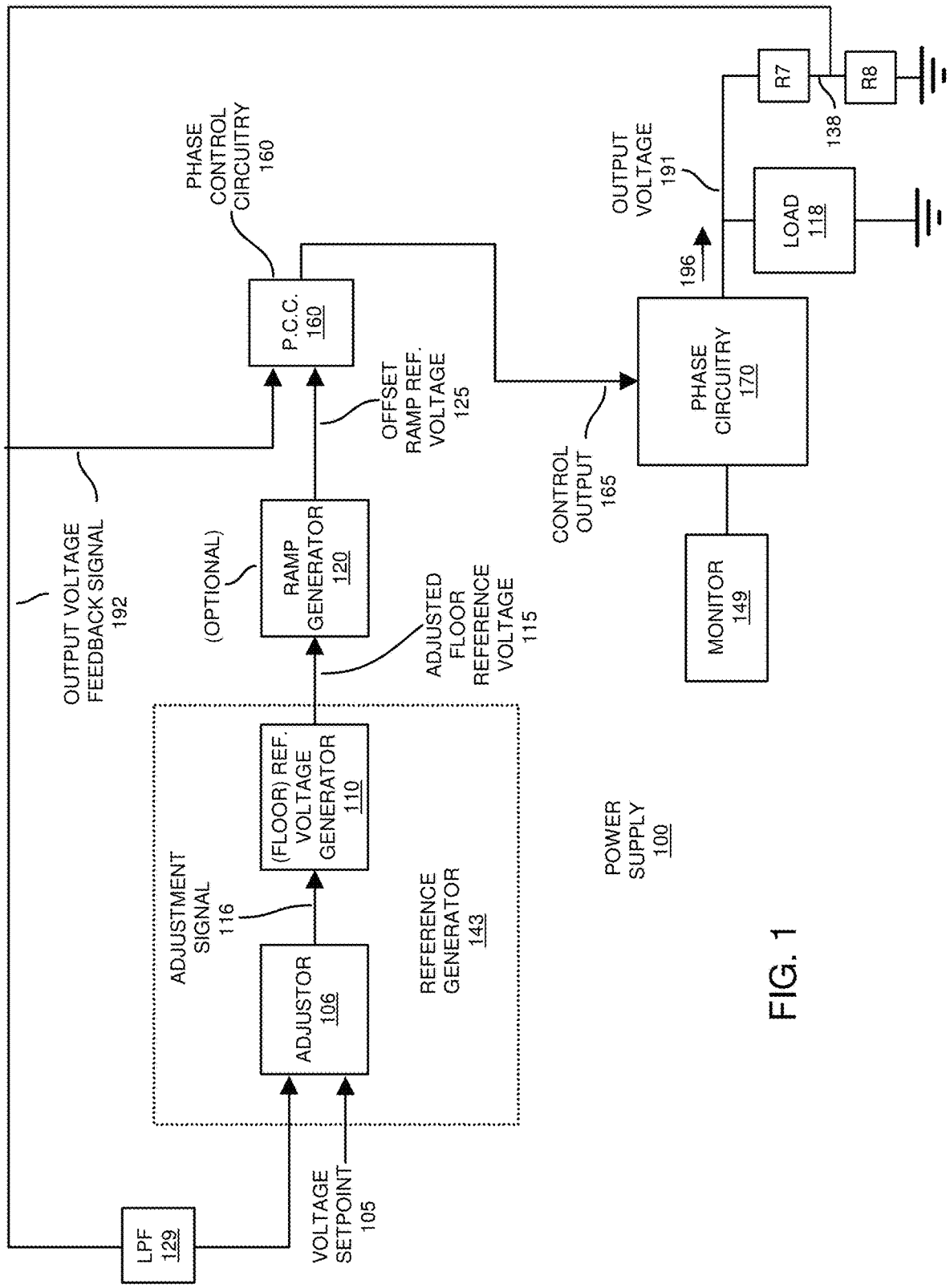
FIG. 1 is an example diagram illustrating a power supply including a reference voltage generator according to embodiments herein.

Now, more specifically, FIG. 1 is an example diagram of a power supply according to embodiments herein.

As shown, power supply 100 includes a reference generator 143, ramp generator 120 (optional), phase control circuitry 160, and phase circuitry 170. The reference generator 143 includes adjustor 106 (i.e., adjustor circuitry, adjustor hardware, etc.) and floor reference voltage generator 110. In general, during operation, the power supply 100 produces output voltage 191 to power the load 118.

Note that each of the different components of the power supply 100 (such as adjustor 106, reference generator 143, ramp generator 120, phase control circuitry 160, phase circuitry 170, etc.) is typically implemented in the form of circuitry (hardware). However, the instantiation of same may vary depending on the embodiment. For example, each of the different components of power supply 100 can be configured to include hardware and corresponding executable software to carry out respective functionality as discussed herein.

In general, during operation such as in a diode emulation mode (discontinuous conduction mode), the reference generator 143 produces an adjusted reference voltage 115 to maintain a magnitude of the output voltage 191 within a desired regulation.

In one embodiment, a controller such as phase control circuitry 160 controls the power supply phase to produce the output voltage 191 to power the load 118 as a function of the reference voltage 115 and an output voltage feedback signal 192 derived from the output voltage 191. In one embodiment, if a magnitude of the output voltage 191 falls outside an acceptable voltage range, the adjustor 106 adjusts a magnitude of the reference voltage 115 to maintain regulation of the output voltage 191 with respect to a desired voltage setpoint 105.

Figure 3:
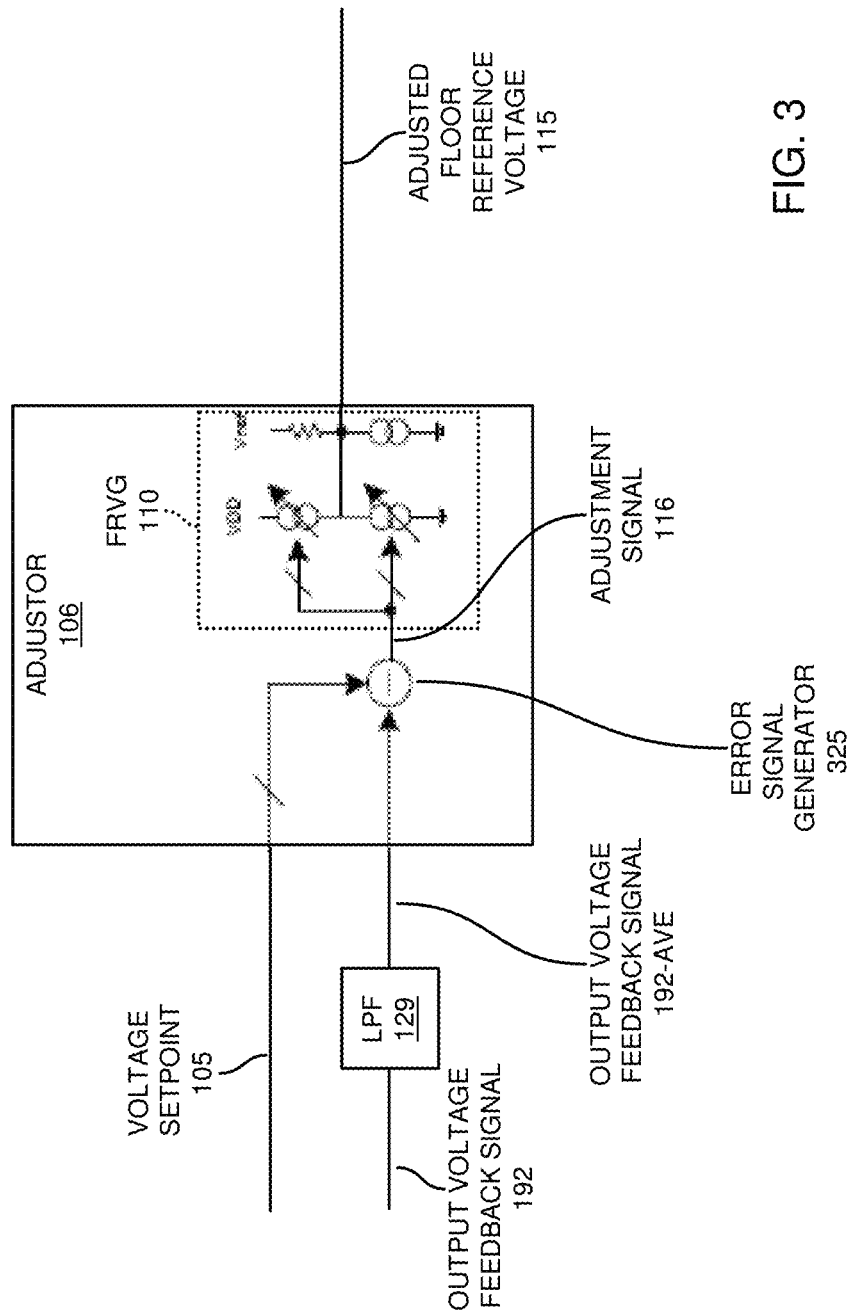
FIG. 3 is an example diagram illustrating an adjustor and related circuitry according to embodiments herein.

As further shown in FIG. 3, the power supply and adjustor 106 can be configured to include an error signal generator 325 (a monitor circuit) to produce the adjustment signal 116 (such as an error voltage) indicating a difference between the desired voltage setpoint 105 and a current magnitude of the output voltage feedback signal 192-AVE. In such an instance, the floor reference voltage generator 110 of adjustor 106 adjusts the magnitude of the (floor) reference voltage 115 based on a magnitude of the adjustment signal 116 (error voltage). Further details of the adjustor in FIG. 3 are discussed below.

Referring again to FIG. 1, in one embodiment, the adjustment to the reference voltage 115 causes the power supply 100 to produce the output voltage 191 to a value nearer in magnitude to a voltage as specified by the desired voltage set point 105.

Note that as an alternative to measuring a magnitude of and nearness of a magnitude of the output voltage 191 to the desired voltage set point 105, embodiments herein can include monitoring a ripple current associated with the output voltage 191 that delivers corresponding current 196 to the load 118.

For example, further embodiments herein include a monitor 149 to monitor and detect a magnitude of ripple current delivered to the load via the output voltage 191. The monitor 149 can be configured to physically monitor voltages on one or more nodes of the power supply 100 to detect an amount of current 196 delivered to the load 118 as is known in the art. Alternatively, the monitor 149 can be an emulator operable to produce a current value indicative of different magnitudes of current 196 delivered to the load 118 over time. In such an instance, the adjustor 106 is operable to adjust the magnitude of the reference voltage 115 based on an amount of detected ripple current such that a magnitude (or average magnitude) of the output voltage is substantially equal to the desired voltage setpoint.

In accordance with further embodiments, the reference voltage 115 is a floor reference voltage. The adjustor 106 modifies the (floor) reference voltage 115 to maintain the magnitude of the output voltage 191 to a setting as specified by the desired voltage setpoint 105.

Figure 4:
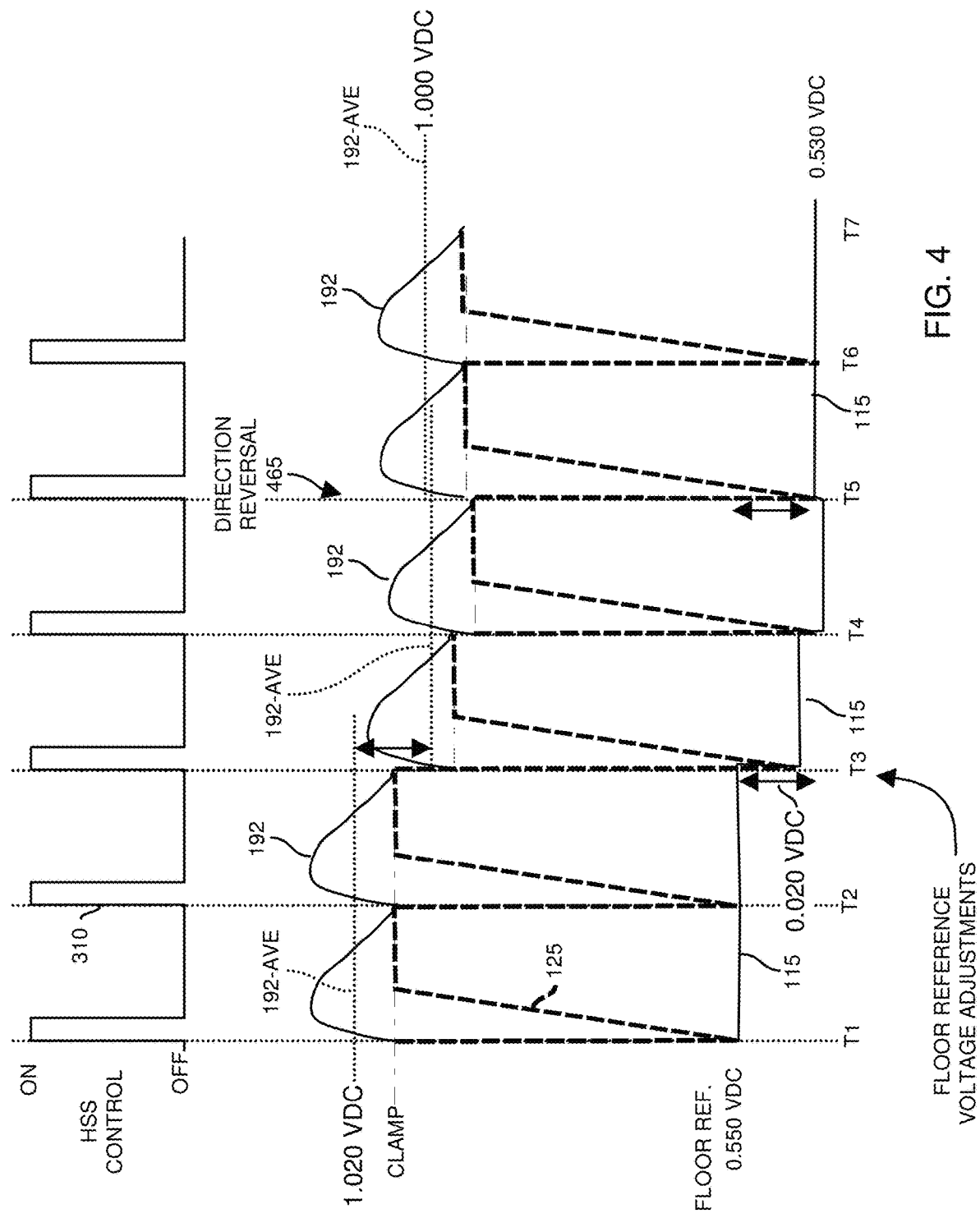
FIG. 4 is an example diagram illustrating a timing of applying adjustments to a reference voltage to maintain an output voltage within regulation according to embodiments herein.
Figure 5:
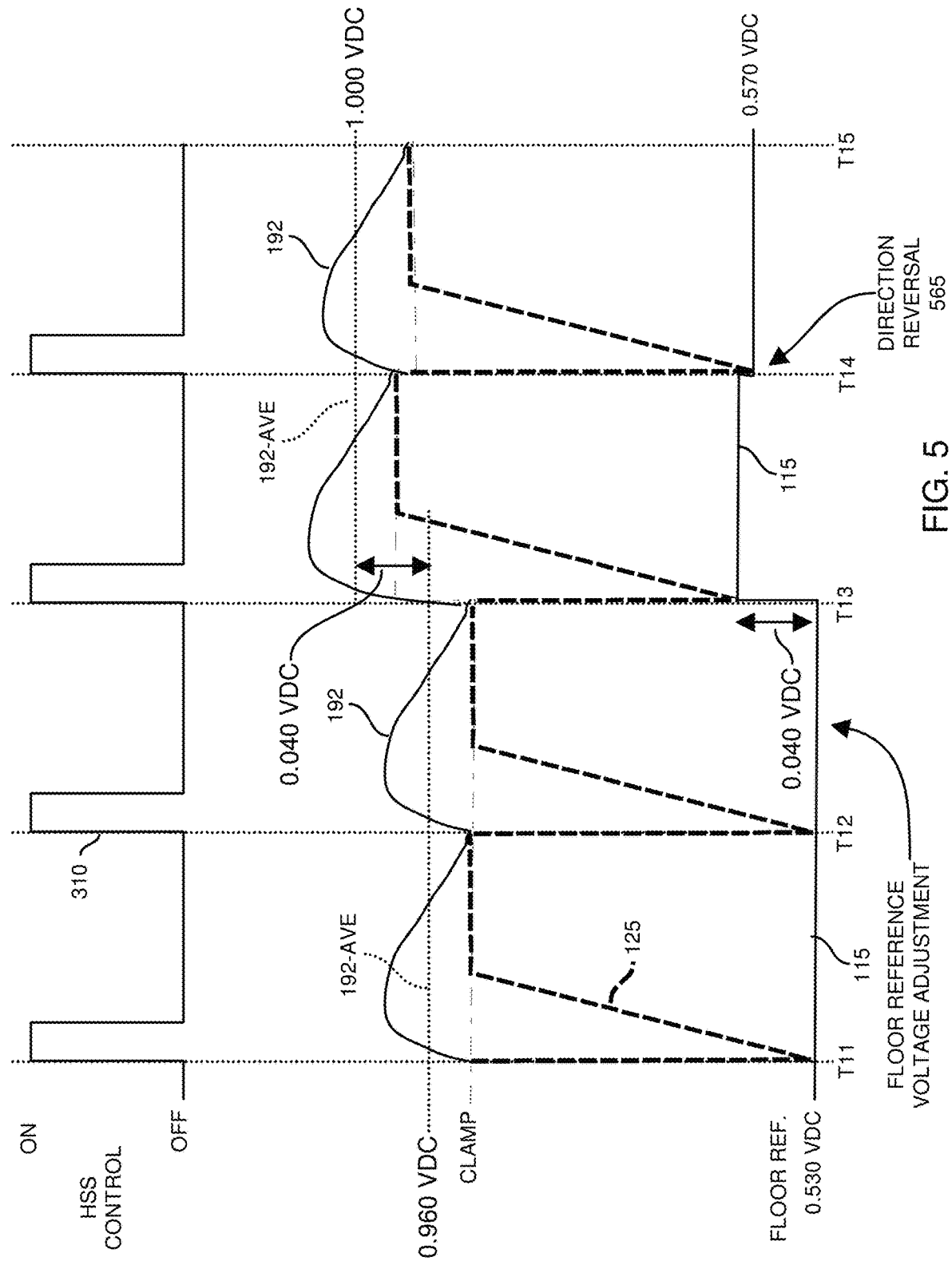
FIG. 5 is an example diagram illustrating a timing of applying adjustments to a reference voltage to maintain an output voltage within regulation according to embodiments herein.

More specifically, in one embodiment as shown in FIG. 4, the adjustor 106 is operable to reduce a magnitude of the reference voltage 115 in response to detecting that a magnitude of the output voltage 191 is greater than the desired voltage setpoint 105 (such as a fixed DC voltage setpoint). Conversely, in one embodiment as shown in FIG. 5, the adjustor 106 is operable to increase a magnitude of the reference voltage 115 in response to detecting that a magnitude of the output voltage 191 is less than the desired voltage setpoint.

Referring again to FIG. 1, the power supply 100 as discussed herein can be operated in any suitable mode. In one embodiment, the adjustor 106 is used in a respective diode emulation mode to adjust the magnitude of the reference voltage 115. As previously discussed, the diode emulation mode is a mode in which high side switch circuitry (control switch circuitry) in the phase 170 is occasionally pulsed to an ON state to maintain regulation of the output voltage 191 while corresponding low side switch circuitry (synchronous switch circuitry) is always disable (OFF).

In accordance with still further embodiments, a respective phase of the power supply 100 is operated in a constant ON-time mode in which high side switch circuitry 150-1 in the phase (such as phase circuitry 170) is activated for a predetermined pulse time for each of multiple successive control cycles to produce the output voltage 191 within a desired voltage range.

Note that, in one embodiment, the output voltage feedback signal 192 is a ratio metric value derived from the output voltage 191. For instance, this metric is defined by [R8/(R7+R8)] *output voltage 191. R7 and R8 are resistor values that can be any suitable values depending on the embodiment. If desired, the output voltage feedback signal 192 is set to the output voltage 191.

The difference in magnitude between the output voltage feedback signal 192 and the voltage setpoint 105 indicates a degree to which the respective output voltage 191 of the power supply 100 is in or out of regulation. As further described herein, the adjustor 106 produces the adjustment signal 116, a magnitude of which varies depending on a difference between the output voltage feedback signal 192 and the voltage setpoint 105. Adjustment signal 116 controls changes to the reference voltage 115 produced by the adjustor 106.

The ramp generator 120 uses the reference voltage 115 as a basis to produce the offset ramp reference voltage 125. For example, the ramp generator 120 produces offset ramp reference voltage 125, which is a ramp signal that is offset with respect to the reference voltage 115.

The phase control circuitry 160 uses the offset ramp reference voltage 125 (or reference voltage 115 if the ramp generator 120 is not present) as a basis in which to generate control output 165. For example, in one embodiment, when the magnitude of the output voltage feedback signal 192 crosses the offset ramp reference voltage 125, the phase control circuitry 160 generates the control output 165 to activate the phase circuitry 170 to maintain the magnitude of the output voltage 191 within a desired voltage range. Further details regarding the operation of the power supply 100 are presented below.

Figure 2:
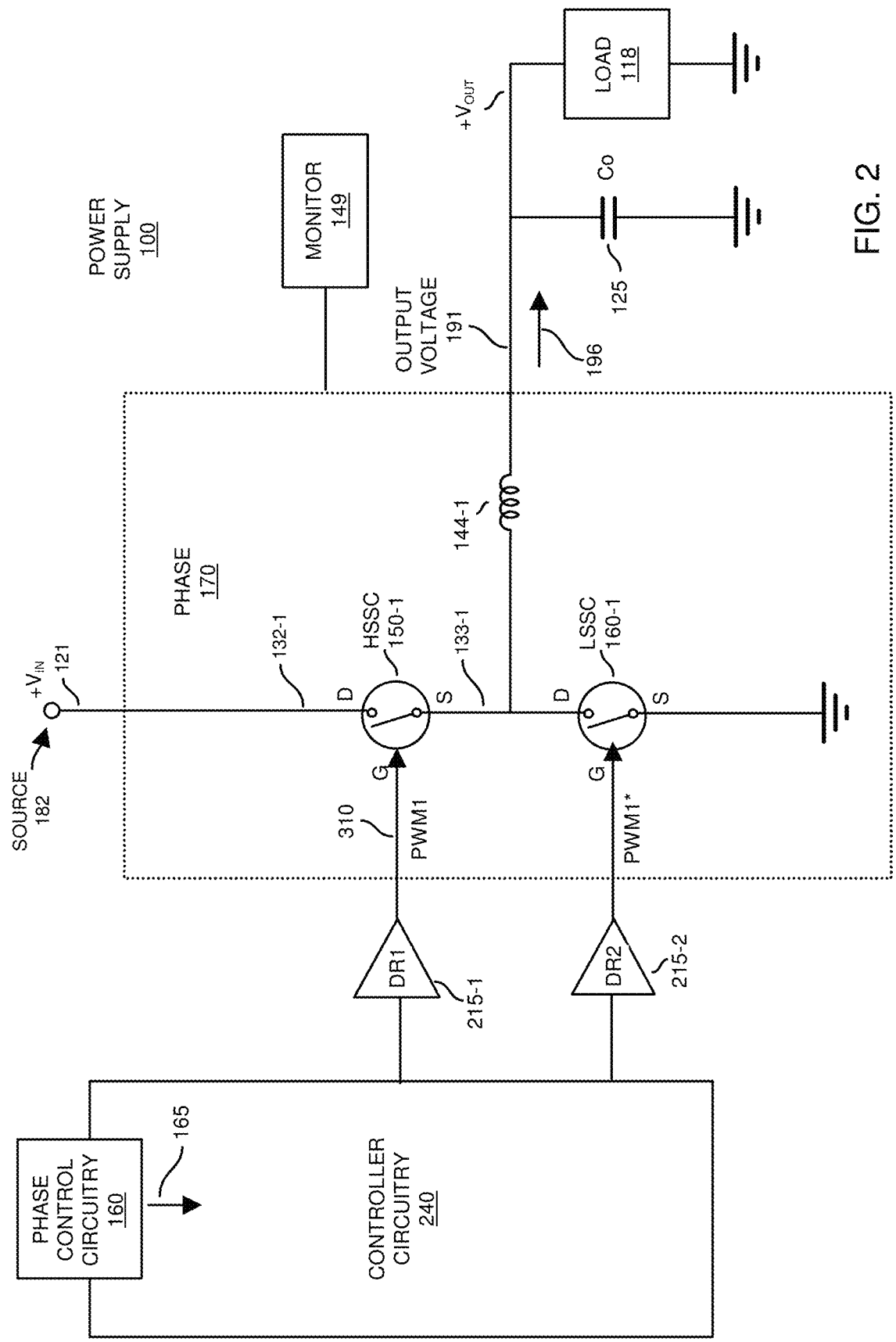
FIG. 2 is an example diagram illustrating a power converter circuit (such as including one phase) of a power supply according to embodiments herein.

FIG. 2 is an example diagram illustrating a DC-to-DC buck converter configuration of respective phase circuitry to produce the output voltage according to embodiments herein.

As shown in FIG. 2, the phase circuitry 170 used to generate output voltage 191 includes driver circuitry 215-1, driver circuitry 215-2, high side switch circuitry 150-1 (such as a control switch or switches), low side switch circuitry 160-1 (such as a synchronous switch or switches), controller circuitry 240 and inductor 144-1. Control output 165 produced by phase control circuitry 160 serves as a basis to control high side switch circuitry 150-1 and low side switch circuitry 160-1.

Note that switch circuitry 150-1, 160-1 can be any suitable type of switch resource (field effect transistors, bipolar junction transistors, etc.). In one embodiment, each of the high side switch circuitry 150-1 and low side switch circuitry 160-1 are power MOSFET (Metal Oxide Semiconductor Field Effect Transistor) or other suitable switch devices.

Appropriate switching of the high side switch circuitry 150-1 and the low side switch circuitry 160-1 results in generation of the output voltage 191 as is known in a conventional DC-DC converter such as a buck converter.

Further in this example embodiment, the controller circuitry 240 receives control output 165 from phase control circuitry 160 and, on this basis, controls the driver circuitry 215-1 and driver circuitry 215-2 to produce a PWM1 control signal 310 (PWM1) to control high side switch circuitry 150-1 and corresponding PWM1*control signal to control low-side switch circuitry 160-1.

In general, during continuous conduction mode, the low side switch circuitry 160-1 is activated (closed or ON) when the high side switch circuitry 150-1 is deactivated (open or OFF), and vice versa.

During diode emulation mode, the high side switch circuitry 150-1 is repeatedly pulsed ON and OFF while low side switch circuitry 160-1 is constantly deactivated (OFF or open circuit).

Additional details of controlling the high side switch circuitry 150-1 and the low side switch circuitry 160-1 are further discussed below.

As further discussed herein, the phase control circuitry 160 (of FIG. 1) can be configured to compare the (floor) reference voltage 115 and the output voltage feedback signal 192 in a manner as previously discussed to determine a timing of activating high side switch circuitry 150-1 of the respective phase in the phase circuitry 170 to an ON (closed switch) state.

In one embodiment, the reference voltage 115 or offset ramp reference voltage 125 serves as a threshold value. In such an instance, when the magnitude of the output voltage feedback signal 192 is equal to, crosses, or falls below a magnitude of the floor reference voltage 115 or offset ramp reference voltage signal 125, the phase control circuitry 160 produces the control output 165 to turn ON the high side switch circuitry 150-1 (at which time the low side switch circuitry 160-1 is turned OFF).

Note further that the power supply 100 and corresponding phase 170-1 can be operated in a so-called constant ON-time control mode in which the PWM (Pulse Width Modulation) setting of the ON-time of control pulses of switch circuitry (such as high side switch circuitry 150-1) in a phase is constant or fixed; the OFF time of high side switch circuitry 150-1 varies depending upon a subsequent cycle of comparing the floor reference voltage 115 to the output voltage feedback signal 192 and issuance of pulsing the high side switch circuitry 150-1 ON again via subsequent generate fixed pulse width switch control signals. As the rate of decay of the magnitude of the output voltage 191 slows over time, the frequency of pulsing the high side switch circuitry 150-1 ON again decreases. Conversely, as the rate of decay of the magnitude of the output voltage 191 increase over time, the frequency of pulsing the high side switch circuitry 150-1 ON again increases.

Thus, in the constant ON-time control mode in which the ON-time of activating the high side switch circuitry is a fixed or predetermined value, the frequency of activating the high side switch varies to maintain the output voltage 191 to a desired set point.

FIG. 3 is an example diagram illustrating an adjustor and related circuitry according to embodiments herein.

As previously discussed, the output voltage feedback signal 192 can be a DC voltage with a certain amount of ripple voltage (AC portion). In one embodiment, the output voltage feedback signal 192 is fed through the low pass filter 129 (such as a digital-to-analog converter, analog filter, etc.) to produce the output voltage feedback signal 192-AVE, which represents an average RMS (Root Mean Square) DC value of the output voltage feedback signal 192.

Thus, in one embodiment, passing the output voltage feedback signal 192 through the low pass filter removes ripple to produce an average DC value (an output voltage feedback signal 192-AVE) representative of the an output voltage feedback signal 192.

Further in this example embodiment, as previously discussed, the adjustor 106 includes an error signal generator 325 that produces the adjustment signal 116 based on the difference between the output voltage feedback signal 192-AVE and the voltage setpoint 105. Accordingly, the greater the difference between the voltage setpoint 105 and the output voltage feedback signal 192-AVE, the greater the magnitude of the adjustment signal 116 (error signal).

As further shown, the adjustor 106 includes the floor reference voltage generator 110. The floor reference voltage generator 110 that uses the adjustment signal 116 as a basis in which to control generation of the floor reference voltage 115. For example, if the adjustment signal 116 is zero, the floor reference voltage generator 110 of the adjustor 106 makes no changes to a magnitude of the floor reference voltage 115. If the adjustment signal 116 indicates that the magnitude of the output voltage feedback signal 192-AVE is greater than the voltage setpoint 105, the floor reference voltage generator 110 reduces a magnitude of the floor reference voltage 115. Conversely, if they adjustment signal 116 indicates that the magnitude of the output voltage feedback signal 192-AVE is less than the voltage setpoint 105, the floor reference voltage generator 110 increases a magnitude of the floor reference voltage 115.

More specific examples of adjusting the floor reference voltage 115 is further shown below in FIGS. 4 and 5.

FIG. 4 is an example diagram illustrating a timing of applying adjustments to a reference voltage to maintain an output voltage within regulation according to embodiments herein.

Assume in this example embodiment that the output voltage feedback signal 192 is equal to the output voltage 191 (assume that the resistor R7 equals substantially zero ohms) and that the voltage setpoint 105 is 1.000 VDC. Thus, the target magnitude of the output voltage 191 is 1.000 VDC.

As shown in this example embodiment, the output voltage feedback signal 192 includes substantial ripple voltage (approximately 40 millivolts peak to peak) while operating in the diode emulation mode. The magnitude of the output voltage 191 and an output voltage feedback signal 192 varies around an average DC output voltage value of 1.020 VDC.

As previously discussed, the output voltage feedback signal 192 is input to the low pass filter 129 to produce the output voltage feedback signal 192-AVE (an RMS DC value=1.020 VDC). As mentioned above, assume that the voltage setpoint 105 is set to 1.000 V DC. In a manner as previously discussed, the error signal generator 325 of the adjustor 106 (FIG. 3) produces the adjustment signal 116 based on the 20 mV (milliVolts) difference between the voltage setpoint 105 (1.000 VDC) and the output voltage feedback signal 192-AVE (1.020 VDC). The generated adjustment signal 116 indicates that the output voltage 191 is out of regulation with respect to the desired set point of 1.000 VDC by an amount of 20 mV. As shown, the adjustor 106 is operable to adjust the magnitude of the reference voltage 115 such that an average magnitude of the output voltage feedback signal 192 is substantially equal to the desired voltage setpoint 105.

More specifically, the ramp generator 120 in FIG. 1 produces the offset ramp voltage signal 125. In this example embodiment of FIG. 4, the ramp generator 120 clamps the offset ramp voltage signal 125 to a predetermined CLAMP voltage as shown. In response to activating the high side switch circuitry 150-1 at time T1, the magnitude of the output voltage 191 and corresponding output voltage feedback signal 192 increases at least briefly and then decays (decreases) until the magnitude of the output voltage feedback signal 192 is substantially equal to the offset ramp voltage signal 125 at time T2. Because the power supply 100 is operated in the constant on-time mode during diode emulation, the phase control circuitry 160 initiates activation of the high side switch circuitry 150-1 again at time T2.

As previously discussed, the adjustor 106 compares the magnitude of the voltage setpoint 105 and the output voltage feedback signal 192-AVE. In response to detecting that the output voltage 191 and corresponding output voltage feedback signal 192-AVE are offset by 20 mV (0.020 V DC) with respect to the desired voltage setpoint 105 of 1.000 V DC, the adjustor 106 reduces the magnitude of the reference voltage 115 by 20 mV DC (0.020 VDC) at or around time T3.

Reducing the magnitude of the floor reference voltage 115 at around time T3 by 20 mV causes subsequent generation of the output voltage feedback signal 192-AVE to be reduced by a magnitude of 20 mVDC. In other words, because the floor reference voltage 115 is reduced by 20 mV, the magnitude of the output voltage 191 also is reduced by 20 mV DC. As shown, during such a condition, the output voltage feedback signal 192-AVE between time T3 and T5 to 1.000 V DC. Because the output voltage feedback signal 192-AVE is equal to the voltage setpoint 105 of 1.000 V DC between time T3 and T5, the adjustor 106 discontinues modifying or adjusting a magnitude of the reference voltage 115.

Accordingly, in the diode emulation mode, the adjustor 106 is operable to modify the magnitude of the reference voltage 115 such that the magnitudes of the output voltage 191 and corresponding output voltage feedback signal 192 are maintained at a desired setting.

Note further that the adjustor 106 can be configured to continuously adjust the reference voltage for each of the multiple control cycles to maintain the output voltage 191 at a desired value. Alternatively, the adjustor 106 can be configured to discontinue adjusting the magnitude of the reference voltage in response to detecting a condition in which an average magnitude of the output voltage 191 and/or an output voltage feedback signal 192-AVE is substantially equal to the desired voltage setpoint 105.

In the latter example embodiment, as shown in FIG. 4, the adjustor 106 discontinues (disables) adjusting the reference voltage at time T5 in response to detecting a change in polarity of successive reference voltage adjustments such as indicated by direction reversal 465 at time T5. More specifically, as shown, the adjustor 106 reduces a magnitude of the reference voltage at times T3 and T4 to maintain the magnitude of the output voltage feedback signal 192-AVE to be equal to the setpoint of 1.000 VDC. At time T5, the adjustor 106 increases a magnitude of the reference voltage 115 to maintain the magnitude of the output voltage feedback signal 192-AVE to be substantially equal to the setpoint of 1.000 VDC. In response to detecting the polarity change of reducing the magnitude of the reference voltage 115 to increasing a magnitude of the reference voltage 115 at time T5, the adjustor 106 discontinues (disables) adjusting the magnitude of the reference voltage 115 for subsequent cycles (such as during a steady state mode) to prevent oscillating between increasing and decreasing the magnitude of the reference voltage 115 from one cycle to the next cycle. Such an embodiment and act of disabling reference voltage adjustments is useful to further reduce a magnitude of the ripple voltage associated with output voltage 191.

Accordingly, in one embodiment, the adjustor 106 is operable to discontinue (disable) adjusting the magnitude of the reference voltage 115 in response to detecting a polarity change at time T5 of modifying the reference voltage 115 to maintain regulation of the output voltage 191 as specified by the desired voltage setpoint of 1.000 VDC.

In accordance with further embodiments, during a steady state mode in which the adjustor 106 does not adjust the reference voltage 115 (when reference voltage adjustment is disabled during the diode emulation mode), the adjustor 106 monitors one or more parameters of the power supply 100 to determine whether to revert back to enable adjusting the reference voltage 115 again in the diode emulation mode. For example, in one embodiment, the adjustor 106 monitors a power supply parameter such as an amount of current provided by the power supply 100 to the load 118. In response to detecting condition such as a change in current 196 consumption by the load 118 above a threshold value, the adjustor 106 operates in the reference voltage adjustment mode again (such as previously discussed between times T2 and T5) to maintain the magnitude of the of the output voltage 192 at the desired setpoint.

In accordance with another embodiment, the adjustor 106 monitors a power supply parameter such as a magnitude of the output voltage feedback signal 192. In response to detecting a condition such as a change in a magnitude of the output voltage feedback signal 192 above a threshold value, the adjustor 106 operates in the adjustment mode again (such as previously discussed between times T2 and T5) to maintain the magnitude of the of the output voltage 192. Accordingly, in one embodiment, the adjustor 106 is operable to adjust the magnitude of the reference voltage 115 again to maintain regulation of the output voltage 191 as specified by the desired voltage setpoint 1.000 VDC in response to detecting that a monitored parameter of the power supply (such as change in magnitude of the output voltage 191, change in magnitude of the current consumption by load 118, etc.) is greater than a threshold value.

FIG. 5 is an example diagram illustrating a timing of applying adjustments to a reference voltage to maintain an output voltage within regulation according to embodiments herein.

Assume in this example embodiment that the output voltage feedback signal 192 is equal to the output voltage 191 (resistor R7 equals substantially zero ohms) and that the voltage setpoint 105 is 1.000 VDC. Thus, the target magnitude of the output voltage 191 is 1.000 VDC.

As shown in this example embodiment, the output voltage feedback signal 192 includes substantial ripple voltage (approximately 80 millivolts peak to peak) while operating in the diode emulation mode. As shown in FIG. 5, the magnitude of the output voltage 191 and an output voltage feedback signal 192 varies around an average DC output voltage value of 0.960 VDC.

As previously discussed, the output voltage feedback signal 192 is input to the low pass filter 129 to produce the output voltage feedback signal 192-AVE (an RMS DC value=0.960). As mentioned above, assume that the voltage setpoint 105 is set to 1.000 V DC. In a manner as previously discussed, the error signal generator 325 of the adjustor 106 (FIG. 3) produces the adjustment signal 116 based on the −40 mVDC (milliVolts) difference between the voltage setpoint 105 (1.000 VDC) and the output voltage feedback signal 192-AVE (0.960 VDC). The generated adjustment signal 116 indicates that the output voltage 191 is out of regulation with respect to the desired set point of 1.000 VDC by an amount of approximately −40 mVDC.

As shown, in this example embodiment, the adjustor 106 is operable to detect a condition such as that the magnitude of the of the difference or offset (such as 40 mV) with respect to a desired setpoint of 1.000 RMS VDC is greater than, for example, a threshold value such as 10 mVDC. In response to detecting the condition, the adjustor 106 is operable to operate in the reference voltage adjustment mode again to adjust the magnitude of the reference voltage 115 such that an average magnitude of the output voltage feedback signal 192 is substantially equal to the desired voltage setpoint 105.

More specifically, as previously discussed, the reference generator 120 produces the offset ramp voltage signal 125. In this example embodiment, the ramp generator 120 clamps the offset ramp voltage signal 125 to a predetermined CLAMP voltage as shown. In response to activating the high side switch circuitry 150-1 at time T11, the magnitude of the output voltage 191 and corresponding output voltage feedback signal 192 increases at least briefly and then decays (decreases) until the magnitude of the output voltage feedback signal 192 is substantially equal to the offset ramp voltage signal 125 at time T12. Because the power supply 100 is operated in the constant on-time mode during diode emulation, the phase control circuitry 160 initiates activation of the high side switch circuitry 150-1 again at time T12, T13, etc.

As previously discussed, the adjustor 106 compares the magnitude of the voltage setpoint 105 and the output voltage feedback signal 192-AVE. In response to detecting that the output voltage 191 and corresponding output voltage feedback signal 192-AVE are offset by −40 mV (−0.040 V DC) with respect to the desired voltage setpoint 105 of 1.000 V DC, the adjustor 106 increases the magnitude of the floor reference voltage 115 by 40 mV DC (0.040 VDC) at or around time T13 as shown in FIG. 5.

Increasing the magnitude of the floor reference voltage 115 at around time T13 by 40 mV causes subsequent generation of the output voltage feedback signal 192-AVE to be increased by a magnitude of 40 mV DC. In other words, because the floor reference voltage 115 is increased by 40 mVDC, the magnitude of the output voltage 191 also is reduced by 40 mV DC. As shown, during such a condition, the output voltage feedback signal 192-AVE between time T13 and T15 is set to 1.000 V DC. Because the an output voltage feedback signal 192-AVE is equal to the voltage setpoint 105 of 1.000 V DC at time T14, the adjustor 106 discontinues modifying or adjusting a magnitude of the floor reference voltage 115.

In accordance with alternative embodiments, in a manner as previously discussed, during the diode emulation mode, the adjustor 106 can be configured to discontinue adjusting the magnitude of the reference voltage 115 in response to detecting a polarity change (direction reversal 565) in adjusting the reference voltage 115 such as at or around time T14.

Accordingly, in the diode emulation mode, the adjustor 106 is operable to modify the magnitude of the reference voltage 115 such that the magnitudes of the output voltage 191 and corresponding output voltage feedback signal 192 are maintained at a desired setting.

Figure 6:
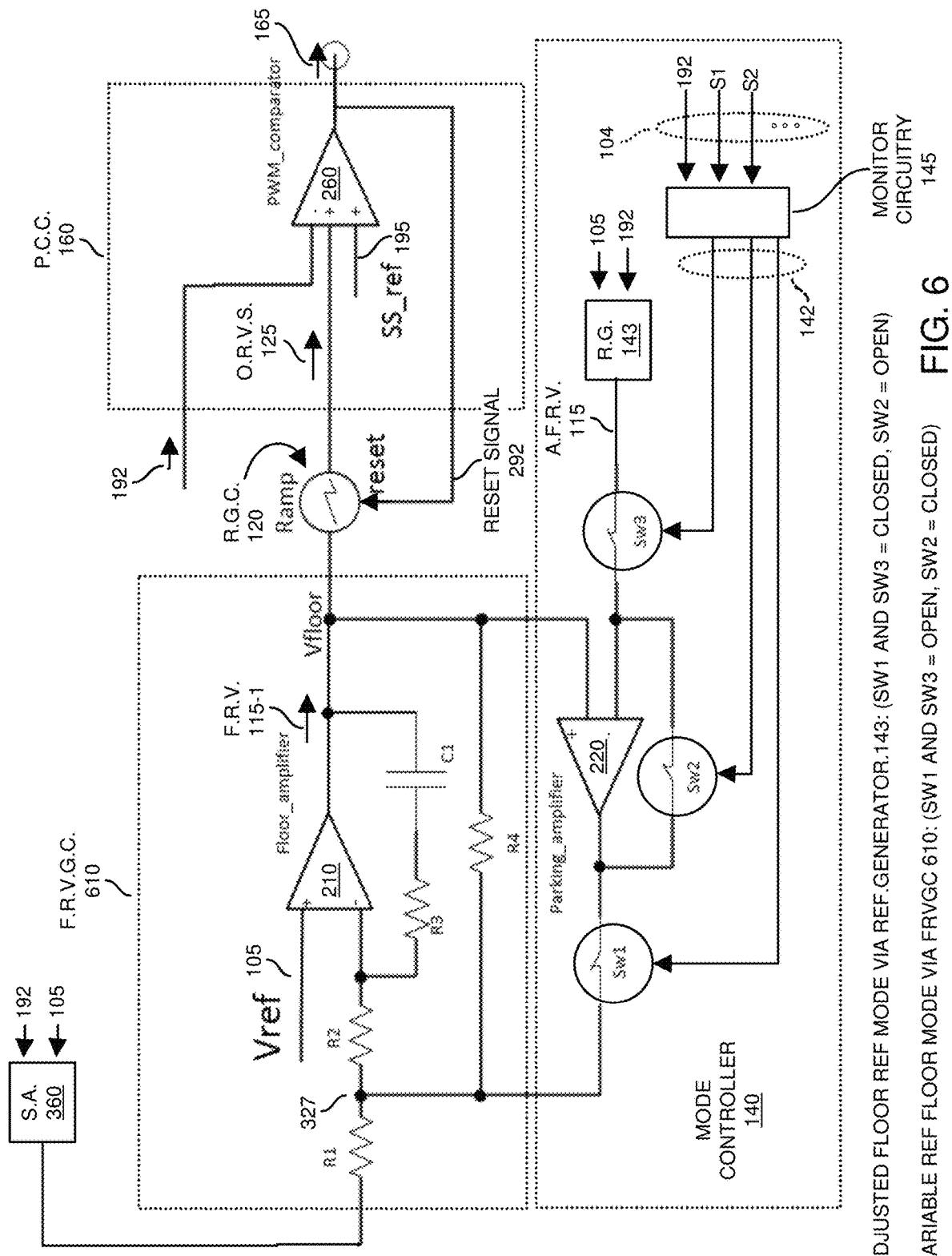
FIG. 6 is a example diagram illustrating multi-mode power supply system and different modes of generating/controlling a reference voltage according to embodiments herein.

FIG. 6 is an example diagram illustrating the details of the floor reference voltage generator, mode controller, and of the phase control circuitry according to embodiments herein.

In accordance with further embodiments, note that the power supply 100 as discussed herein can be configured to include a mode controller 140 that initiates (via control of switches SW1, SW2, and SW3) switching between operating the power supply 100 in a continuous conduction mode versus a discontinuous conduction mode (diode emulation mode).

During the diode emulation mode, the mode controller 140 enables (via closing or shorting of switches SW1 and SW3 and opening of switch SW2) the reference generator 143 to control a magnitude of the floor reference voltage 115-1 (based on floor reference voltage 115 generated by the reference generator 143). In the continuous conduction mode, the mode controller 140 enables (via opening switches SW1 and SW3 and closing or shorting switch SW2) the floor reference voltage generator circuit 610 and input form sense amplifier 360 to control the magnitude of the floor reference voltage 115-1.

Advantageously, the mode controller 140 controls the states of switches SW1, SW2, and SW3 based on the monitoring, via monitor circuitry 145 of the mode controller 140, of one or more conditions (such as operational attributes) of the power supply 100. For instance, power supply conditions are monitored through one or more input 104 (such as an output voltage feedback signal 192, status information S1, S2, etc.).

In one embodiment, the monitor circuitry 145 monitors the magnitude of the output voltage 191 (and/or the output voltage feedback signal 192). In addition or alternatively, the monitor circuitry 145: i) monitors an amount of current 196 provided by the output voltage 191 consumed by the load 118, ii) monitors current (IS1, IS2, IS3, etc., of FIG. 8) through a respective one or more inductors, etc. These operating conditions are further discussed below.

Based on monitoring inputs 104, the mode controller 140 produces mode control output 142 (one or more signals) to control generation of the floor reference voltage 115-1.

As previously discussed, the phase control circuitry 160 is configured to output a control output 165 based on which the phase circuitry 170 outputs the output voltage 191. The control output 165 is determined as a function of the output voltage feedback signal 192 and as a function of the floor reference voltage 115-1. By "as a function of the floor reference voltage", it is understood that the floor reference 115-1 may be used directly as a value used to determine the control output 165 or indirectly, e.g., as used in the definition of a value itself used directly for the determination of the control output 165.

For instance, as discussed in more details below, the output voltage feedback signal 192 and the floor reference voltage 115-1 are compared to one another directly via amplifier 260 to generate the control output 165, optionally also with a soft-startup voltage signal 195 during a soft-startup of the device. Advantageously, this configuration is implemented when the output voltage feedback signal 192 includes a ripple voltage component.

Figure 12:
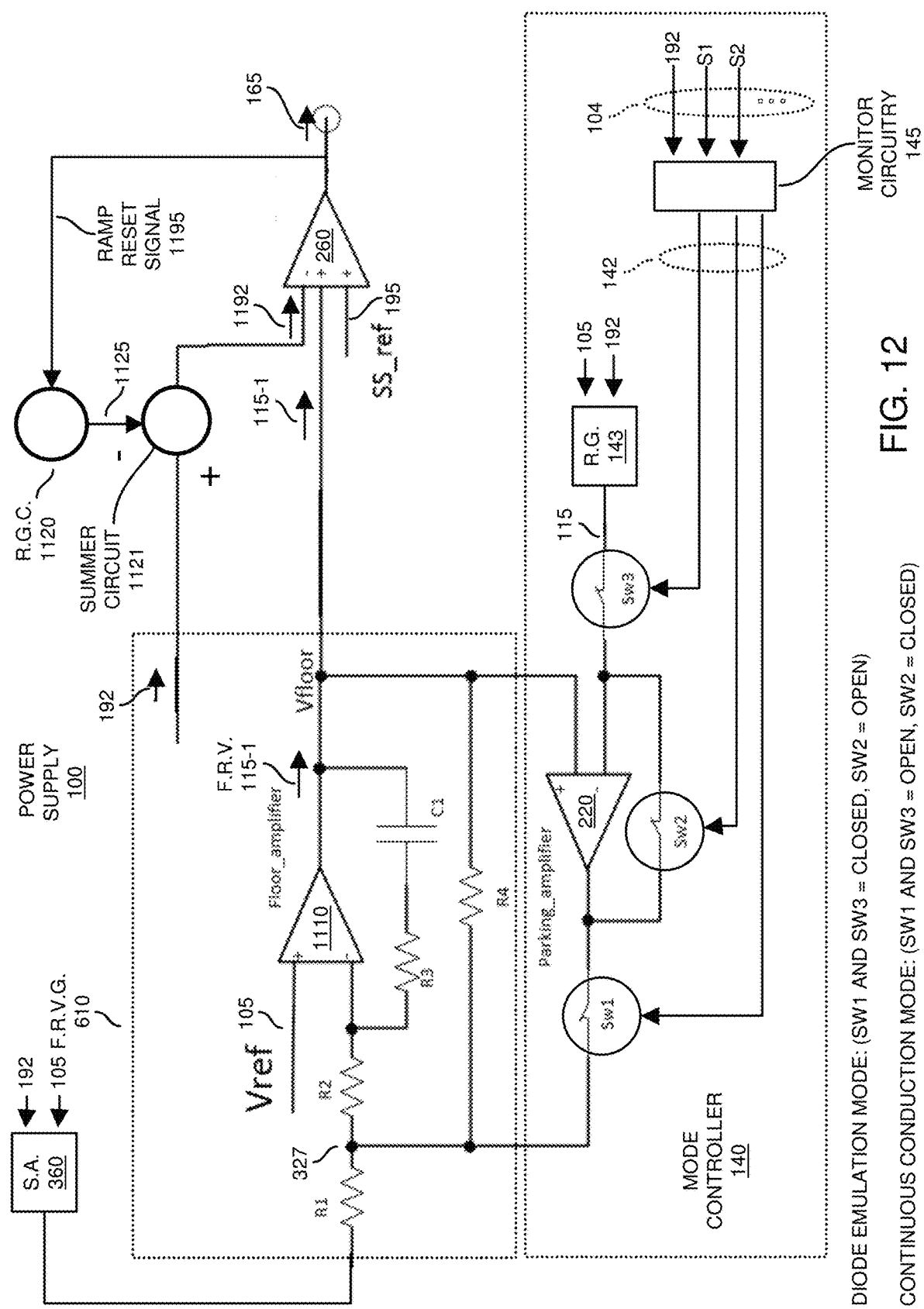
FIG. 12 is an example diagram illustrating a power supply including a floor reference voltage generator, power converter controller, and corresponding mode controller according to embodiments herein.

In another embodiment, such as in FIG. 12, a ramp voltage is used and is offset relative to the output voltage feedback signal 192 to form an offset ramp voltage signal, which is then compared to the floor reference voltage 115 to produce the control output 165 to perform a same function.

Referring again to FIG. 6, as further discussed below, the control output 165 (such as one or more control signals) is used as a basis to control phase circuitry 170 (such as a one or more switching phases of power supply 100) for producing the output voltage 191. In other words, based on control output 165 (such as pulse width modulation control information), the phase circuitry 170 produces the output voltage 191 to power the respective load 118.

As further shown in the non-limiting example embodiment of FIG. 6, the floor reference voltage generator 610 includes amplifier 210 and a configuration of resistors R1, R2, R3, R4, as well as capacitor C1 in a feedback path between the output of amplifier 310 and the non-inverting input of the amplifier 210. Sense amplifier 360 receives, as input, the output voltage feedback signal 192 and voltage setpoint 360 to produce an error signal which drives the input of floor reference voltage generator 110.

For instance, the floor reference voltage generator 110 is configured so as to include a first (outer) gain path (such as combination of resistors R1 and R4) for DC signal gain and a second (inner) gain path (resistors R1 and R2, resistor R3 and capacitor C1) for AC signal gain. In this example embodiment, the first gain path provides DC (Direct Current) gain of $-R4/R1$; the second gain path provides AC (Alternating Current) gain $-R3/[R1+R2]$. In one embodiment, the magnitude of the DC gain provided by the first gain path is substantially higher than a magnitude of the AC gain provided by the second gain path.

In addition to the use of voltage mode amplifier 210, the settings of the passive components R1, R2, R3, R4, and C1 are chosen so as to ensure large DC gain and low high frequency gain to improve overall system accuracy of generating the output voltage 191 at a desired setpoint or within a desired voltage range. Such a configuration also avoids instability.

The mode controller 140 includes amplifier 220, switches SW1, SW2, and SW3, as well as monitor circuitry 145. The mode controller 140 controls an operational mode setting of the floor reference voltage generator 110 based on settings of switches SW1, SW2, and SW3.

During operation in the diode emulation mode, the reference voltage 115 produced by reference generator 143 is coupled to the inverting input of the amplifier 220 via closed switch SW3. As further shown, the non-inverting input of the amplifier 220 is connected to receive the floor reference voltage 115-1.

In one embodiment, to operate the floor reference voltage generator 110 during the diode emulation mode, the mode controller 140 sets each of the switches SW1 and SW3 to an ON state (closed, providing very low resistive path) and switch SW2 to an OFF state (open, providing a high resistive path). In such an instance, the mode control output 142 (such as a floor voltage override signal or floor reference voltage 115) outputted from the amplifier 220 to node 327 overrides the input voltage to resistor R1 such that the floor reference voltage generator 610 produces the floor reference voltage 115-1 to be equal to the floor reference voltage 115 generated by the reference generator 143.

In accordance with further embodiments, to operate the floor reference voltage generator 110 in the continuous conduction mode, the mode controller 140 sets each of the switches SW1 and SW3 to an OFF state (opened, providing very high resistive path) and switch SW2 to an ON state (closed, providing a low resistive path). In such an instance, the amplifier 220 no longer drives a feedback path (specifically node 327) of the floor reference voltage generator 110. Instead, the amplifier 220 is set to operate in a unity gain mode in which the output of the amplifier 220 follows (tracks) the floor reference voltage 115 inputted to the non-inverting input of amplifier 220. As previously discussed, in the unity gain mode, closed switch SW2 connects the output of the amplifier 220 to the inverting input of the amplifier 220. Open switch SW1 ensures that the output of the amplifier 220 does not drive node 327 between resistor R1 and resistor R2. Thus, in the variable floor mode, the amplifier 220 can be configured as a tracking circuit operable to track the floor reference voltage 115-1.

Additionally, in the continuous conduction mode, the output of the amplifier 220 is disconnected from driving the feedback path (such as node 327 or resistor R4) of floor reference voltage generator 110. In such an instance, the amplifier 210 produces the floor reference voltage 115-1 based upon a magnitude of voltage setpoint 105 and variations in the magnitude of the output voltage feedback signal 192 as sensed by sense amplifier 360.

Note further that, when the mode controller 140 switches back to operating in the diode emulation mode of operation in which the reference generator 143 controls a magnitude of the floor reference voltage 115-1, the amplifier 210 produces the mode control output 142 to at least initially drive the node 327 between resistor R1 and resistor R2 with the previously tracked voltage value of the amplifier 220 in the unity gain mode. As previously discussed, in the diode emulation mode, the amplifier 220 causes the floor reference voltage generator 610 to drive the floor reference voltage 115-1 in accordance with the output of reference generator 143.

Conditions in which the mode controller 140 switches between modes is further discussed below.

In accordance with further embodiments, regardless of the selected floor reference voltage generator mode, comparator 260 compares the received output voltage feedback signal 192 to the smaller magnitude of the floor reference voltage 115-1 and soft start reference 195 to produce output control 165.

Advantageously, in a form of this embodiment, the output voltage feedback signal 192 includes a ripple voltage component in at least one operational mode of the power supply. In this or these operational modes, the output voltage feedback signal 192 is compared to the floor reference voltage Vfloor (instead of an offset ramp signal 125) to produce the output control 165 for producing the output voltage.

In a specific configuration, for instance implemented during a start-up mode, the output voltage feedback signal 192 is compared to the floor reference voltage Vfloor and to the soft start reference 195 to produce output control 165. As discussed in more details below, the soft start reference 195 may take the form of a linear ramp signal having a portion below the floor reference voltage, and a portion above it.

In one embodiment, ramp reset signal 292 resets the magnitude of the ramp voltage each time the high side switch circuitry 150-1 is pulsed ON.

Figure 7:
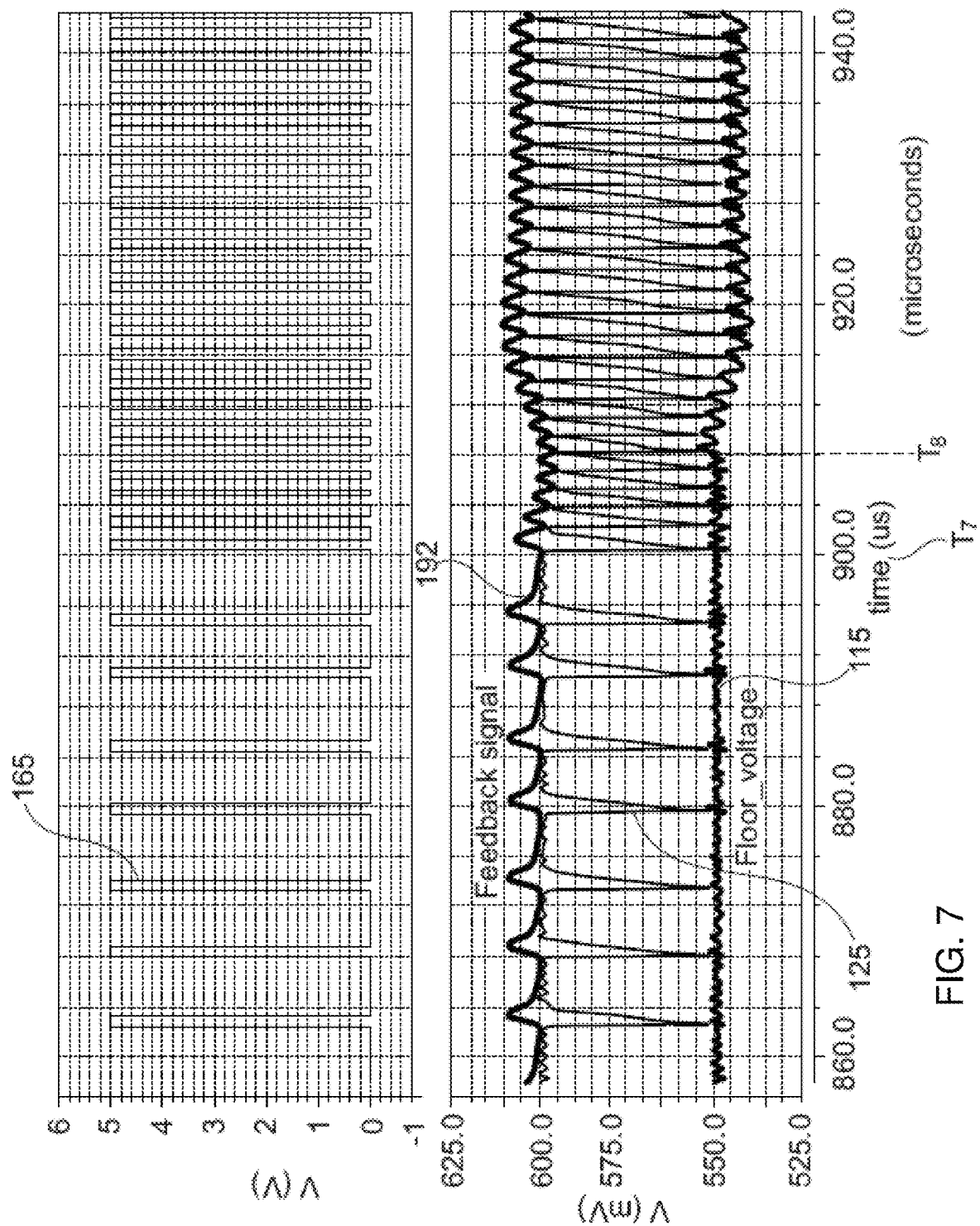
FIG. 7 is an example timing-diagram illustrating generation of a reference voltage and switchover from operating in a diode emulation mode and a continuous conduction mode according to embodiments herein.

FIG. 7 is an example timing diagram illustrating switchover from operating in a diode emulation mode (discontinuous conduction mode) to operating in a continuous conduction mode according to embodiments herein.

As shown in FIG. 7, during diode emulation mode during which the load 118 consumes a small amount of current (below a threshold value) prior to time T7, the phase control circuitry 160 operates in a discontinuous conduction mode (also known as diode emulation mode). In this mode, due to low or no current consumption by the load 118, the magnitude of the output voltage feedback signal 192 can remain above the regulation reference and offset ramp voltage signal 125 for a significant amount of time without activating the high side switch circuitry 150-1 again. Low side switch circuitry 160-1 is not activated in the diode emulation mode (such as prior to time t7, which corresponds to 900 microseconds). Optionally, as in the configuration shown, the offset ramp reference voltage signal 125 is clamped a voltage value such as 600 millivolts. Accordingly, the offset ramp voltage signal 125 is cyclical; each cycle of the ramp voltage signal 125 has a monotonous portion during which the ramp voltage signal increases or decreases, and a clamped portion in which a magnitude of the ramp voltage signal is substantially constant (such as 600 millivolts).

One embodiment herein includes monitoring a parameter such as the amount of current (direct measurement, emulated current, etc.) delivered to the load via the output voltage 191. During a condition in which the monitor circuit 145 detects that the supplied current such as current through the inductor 144-1 (of FIG. 2) is below a threshold value, or when the current is negative flowing from capacitor 125 through inductor 144-1 to node 133-1 (FIG. 2), the mode controller 140 operates power supply 100 in the diode emulation mode (adjustable floor voltage mode or mode #1) during which switches SW1 and SW3 are closed and switch SW2 is open (see FIG. 6).

In a manner as previously discussed, operation in the adjustable voltage floor mode (diode emulation mode) causes the floor reference voltage 115 and reference voltage 115-1 to be adjusted to a suitable voltage value such that an average magnitude of the output voltage 191 is substantially equal to the voltage setpoint 105. Thus, embodiments herein can include operating in the so-called adjustable floor voltage mode when diode emulation is recognized, producing a more accurate output voltage 191.

When the monitor circuit 145 detects that the load 118 consumes substantial current from the generated output voltage 191 again, such as above a threshold value amount of current or a voltage droop of the output voltage 191 below a threshold value occurs, the mode controller 140 switches to operating in the variable floor mode (mode #2, continuous conduction mode) during which switches S1 and S3 are opened and switch S2 is closed.

Subsequent to detecting occurrence of one or more conditions such as an increase in current consumption or droop in the magnitude of the output voltage 191 below a threshold value at, around, or for a duration of time before time T8, which corresponds to 908 microseconds, mode controller 140 switches over to operating the floor reference voltage generator 110 in the so-called variable (active) floor mode (mode #2, continuous conduction mode) in which the floor reference voltage 115 varies depending on the magnitude of the output voltage 191 (or an output voltage feedback signal 192).

Thus, after time T8 as shown in timing diagram 700, when the load 118 consumes substantial current from the output voltage 191, the phase control circuitry 160 produces the output control 165 (or PWM signal 310) to more frequently activate high side switch circuitry 150-1 for the constant ON time pulse durations to maintain the output voltage 191 within a desired range.

Figure 8:
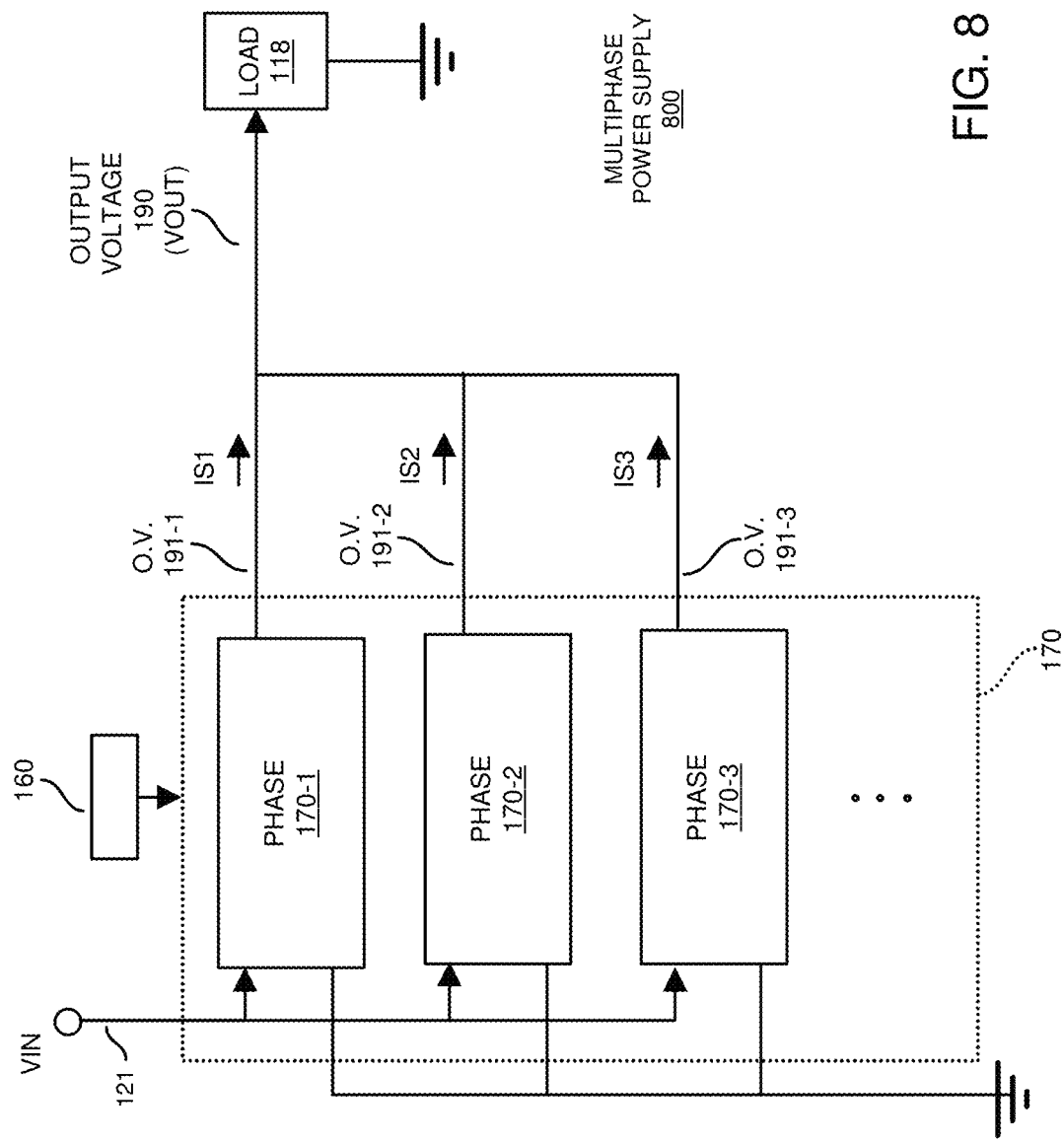
FIG. 8 is an example diagram illustrating use of control circuitry to control multiple phases according to embodiments herein.

FIG. 8 is an example diagram illustrating use of control circuitry to control multiple phases according to embodiments herein.

As shown, phase circuitry 170 of the multiphase power supply 800 can be configured to include phase 170-1, phase 170-2, phase 170-3, etc. Each of the phases contributes to supplying current to the load 118.

In a similar manner as previously discussed, the controller circuitry 140 (in FIG. 1) or duplicate of controller circuitry 140 for each phase can be configured to operate each of the phases 170-1, 170-2, etc., in a constant ON-time operational mode, diode emulation mode, continuous conduction mode, etc. In such an instance, each of the phases 170-1, 170-2, 173, etc., is configured in a similar manner as the single phase as shown in FIG. 2 to contribute to generation of the output voltage 191.

In other words, in case the power supply includes a plurality of phases, the functionalities disclosed herein, in particular that of the reference generator 143, optional ramp generator 120, mode controller 140, phase control circuitry 160 and phase circuitry disclosed in reference to FIGS. 1 and 2 are preferably implemented for each phase. If desired, these circuitries may be mutualized between the phases, or a given circuitry may be associated only to a single phase.

Figure 9:
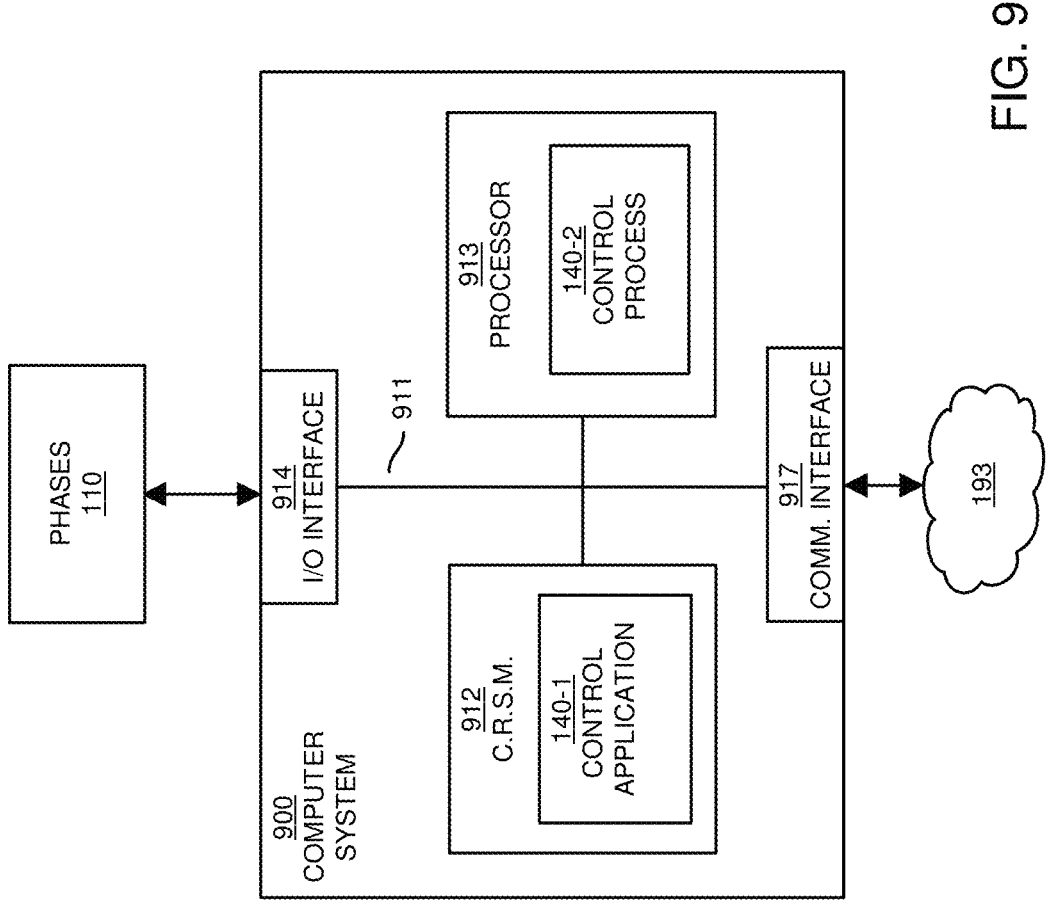
FIG. 9 is an example diagram illustrating computer processor hardware and related software instructions or logic circuit to execute methods according to embodiments herein.

FIG. 9 is an example block diagram of a computer device for implementing any of the operations as discussed herein according to embodiments herein.

As shown, computer system 900 (such as implementing any of one or more resources such as adjustor 106, reference voltage generator 110, mode controller 140, monitor circuitry 145, reference generator 143, ramp generator 120, phase control circuitry 160, etc.) of the present example includes an interconnect 911 that couples computer readable storage media 912 such as a non-transitory type of media (or hardware storage media) in which digital information can be stored and retrieved, a processor 913 (e.g., computer processor hardware such as one or more processor devices), I/O interface 914, and a communications interface 919.

I/O interface 914 provides connectivity to any suitable circuitry such as each of phases 110.

Computer readable storage medium 912 can be any hardware storage resource or device such as memory, optical storage, hard drive, floppy disk, etc. In one embodiment, the computer readable storage medium 912 stores instructions and/or data used by the control application 140-1 to perform any of the operations as described herein.

Further in this example embodiment, communications interface 918 enables the computer system 900 and processor 913 to communicate over a resource such as network 193 to retrieve information from remote sources and communicate with other computers.

As shown, computer readable storage media 912 is encoded with control application 140-1 (e.g., software, firmware, etc.) executed by processor 913. Control application 140-1 can be configured to include instructions to implement any of the operations as discussed herein.

During operation of one embodiment, processor 913 accesses computer readable storage media 912 via the use of interconnect 911 in order to launch, run, execute, interpret or otherwise perform the instructions in control application 140-1 stored on computer readable storage medium 912.

Execution of the control application 140-1 produces processing functionality such as control process 140-2 in processor 913. In other words, the control process 140-2 associated with processor 913 represents one or more aspects of executing control application 140-1 within or upon the processor 913 in the computer system 900.

In accordance with different embodiments, note that computer system 900 can be a micro-controller device, logic, hardware processor, hybrid analog/dif circuitry, etc., configured to control a power supply and perform any of the operations as described herein.

Functionality supported by the different resources will now be discussed via flowcharts in FIGS. 10 and 11. Note that the steps in the flowcharts below can be executed in any suitable order.

Figure 10:
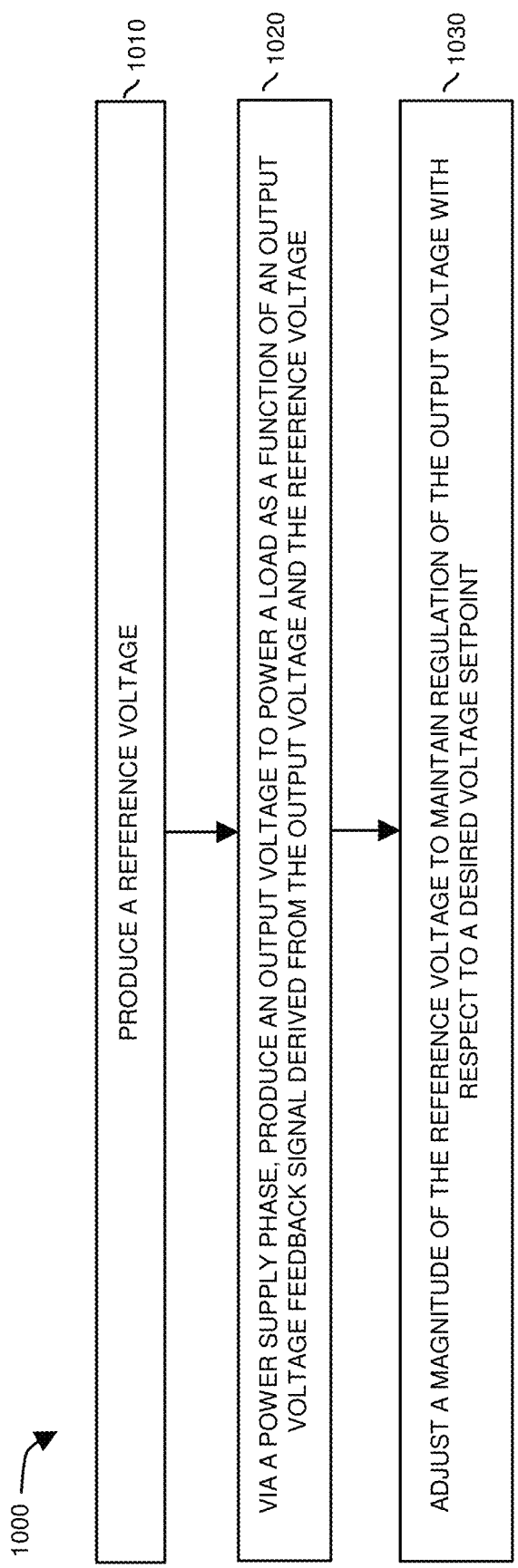
FIGS. 10 and 11 are example diagrams illustrating methods according to embodiments herein.

FIG. 10 is a flowchart 1000 illustrating an example method according to embodiments herein. Note that there will be some overlap with respect to concepts as discussed above.

In processing operation 1010, the reference generator 143 produces a reference voltage 115.

In processing operation 1020, the power supply phase circuitry 170 produces an output voltage 191 to power a load 118 as a function of an output voltage feedback signal 192 derived from the output voltage 191 and the reference voltage 115.

In processing operation 1030, the adjustor 106 adjusts a magnitude of the reference voltage 115 to maintain regulation of the output voltage 191 with respect to a desired voltage setpoint 105.

Figure 11:
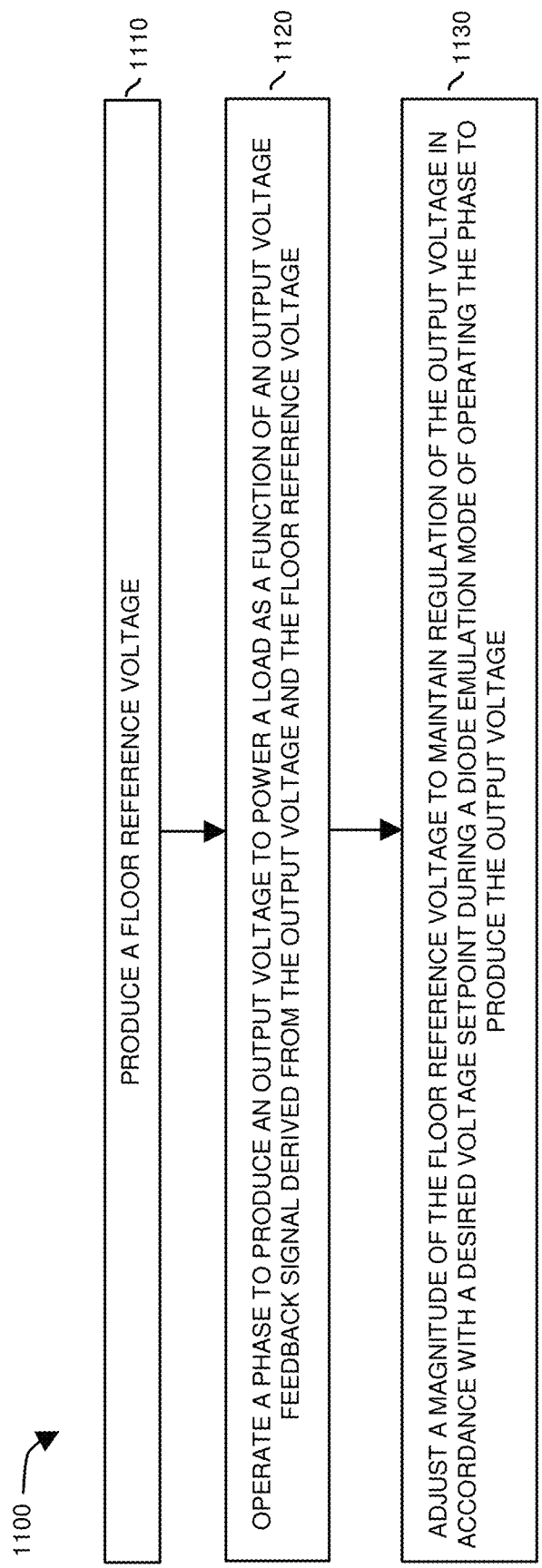

FIG. 11 is a flowchart 1100 illustrating an example method according to embodiments herein. Note that there will be some overlap with respect to concepts as discussed above.

In processing operation 1110, the reference generator 143 of power supply 100 produces a (floor) reference voltage 115.

In processing operation 1120, phase circuitry 170 produces an output voltage 191 to power a load 118 as a function of an output voltage feedback signal 192 derived from the output voltage 191 and the floor reference voltage 115.

In processing operation 1130, the adjustor 106 produces the adjustment signal 116 to adjust a magnitude of the floor reference voltage 115 to maintain regulation of the output voltage 191 in accordance with a desired voltage setpoint 105 during a diode emulation mode of operating the phase circuitry 170.

FIG. 12 is an example diagram illustrating the details of the floor reference voltage generator 110, of the mode controller 140, and of the phase control circuitry according to embodiments herein.

Note that this embodiment includes a ramp generator 1120 that produces a ramp voltage signal 1125 that is offset with respect to the output voltage feedback signal 192 via the summer circuit 1121.

In the non-limiting example embodiment of FIG. 12, the floor reference voltage generator 610 includes amplifier 1110 and a configuration of resistors R1, R2, R3, R4, as well as capacitor C1 in a feedback path between the output of amplifier 1110 and the non-inverting input of the amplifier 1110. In a similar manner as previously discussed, the floor reference voltage generator 610 produces floor reference voltage 115-1 having a magnitude which depends on a mode selected by mode controller 140.

Further, as previously discussed, the mode controller 140 includes amplifier 220, switches SW1, SW2, and SW3, as well as monitor circuitry 145. The mode controller 140 controls an operational mode setting of the floor reference voltage generator 610 based on settings of switches SW1, SW2, and SW3. The monitor circuit 145 monitors one or more power supply conditions to determine in which state (diode emulation mode or continuous conduction mode) to operate the floor reference voltage generator 610.

During operation, a reference voltage 115 from the reference generator 143 is selectively coupled to the inverting input of the amplifier 220 via switch SW3. As further shown, the non-inverting input of the amplifier 220 is connected to receive the floor reference voltage 115-1.

In one embodiment, to operate the floor reference voltage generator 610 during a diode emulation mode, the mode controller 140 sets each of the switches SW1 and SW3 to an ON state (closed, providing very low resistive path) and switch SW2 to an OFF state (open, providing a high resistive path). In such an instance, the control output (such as a floor voltage override signal of reference voltage 115) outputted from the amplifier 220 through switch SW1 to node 327 overrides operation of the floor reference voltage generator 610 such that the floor reference voltage generator 610 produces the floor reference voltage 115-1 based on the reference voltage 115 generated by the reference generator 143.

In accordance with further embodiments, to operate the floor reference voltage generator 610 during a continuous conduction mode, the mode controller 140 sets each of the switches SW1 and SW3 to an OFF state (opened, providing very high resistive path) and switch SW2 to an ON state (closed, providing a low resistive path). In such an instance, the amplifier 220 no longer drives a feedback path (specifically node 327) of the floor reference voltage generator 110. Instead, the amplifier 220 is set to operate in a unity gain mode in which the output of the amplifier 220 follows (tracks) the floor reference voltage 115-1 inputted to the non-inverting input of amplifier 220. As previously discussed, in the unity gain mode, closed switch SW2 connects the output of the amplifier 220 to the inverting input of the amplifier 220. Open switch SW1 ensures that the output of the amplifier 220 does not drive node 327 between resistor R1 and resistor R2. Thus, in the continuous conduction mode, the amplifier 220 can be configured as a tracking circuit operable to track the floor reference voltage 115-1.

Additionally, in the continuous conduction mode, the output of the amplifier 220 is disconnected from driving the feedback path (such as node 327 or resistor R4) of floor reference voltage generator 110. In such an instance, the amplifier 1110 produces the floor reference voltage 115-1 based upon variations in the magnitude of the output voltage feedback signal 192 with respect to the voltage setpoint 105 as sensed by the sense amplifier 360.

Note further that when the mode controller 140 switches back to operating the floor voltage generator circuit 110 from the continuous conduction mode to the discontinuous conduction mode (diode emulation mode), the amplifier 220 produces the mode control output 142 to at least initially drive the node 327 between resistor R1 and resistor R2 with the previously tracked voltage value of the amplifier 220 in the unity gain mode. As previously discussed, in the diode emulation mode, the amplifier 220 causes the floor reference voltage generator 110 to drive the floor reference voltage 115-1 to the value of reference voltage 115 generated by the reference generator 143.

In one embodiment, during operation, ramp generator 1120 produces a ramp voltage signal 1125. The ramp generator 1120 outputs the ramp voltage signal 1125 to the summer circuit 1121. The summer circuit 1121 subtracts a magnitude of the ramp voltage signal 1125 from the output voltage feedback signal 192 to produce offset feedback signal 1192. As its name suggests, the ramp reset signal 1195 resets the ramp signal 1125 when the comparator 260 detects that the magnitude of the output voltage feedback signal 1192 is substantially equal to the floor reference voltage 115-1.

In accordance with further embodiments, regardless of the selected floor voltage generator mode, comparator 260 compares the received offset feedback signal 1192 to the smaller magnitude of the offset ramp voltage signal 1125, and optionally to the soft start reference 195 as well —e.g. during start-up of the device—, to produce output control 165 as previously discussed.

Figure 13:
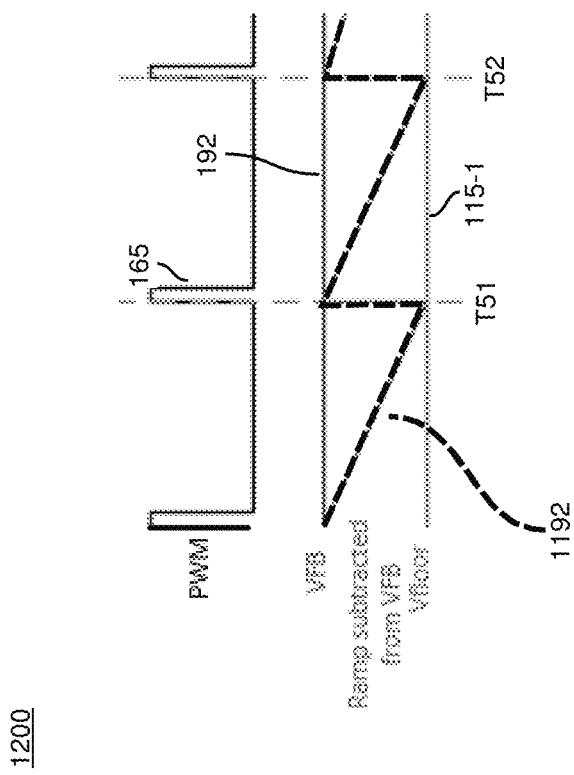
FIG. 13 is an example diagram illustrating a timing diagram of monitoring and controlling a power supply according to embodiments herein.

FIG. 13 is an example timing diagram according to embodiments herein.

As previously discussed in FIG. 12, the floor reference voltage 115-1 may generated in multiple different ways depending on an operational mode of the power supply 100 as selected by mode controller 140.

During operation of the power supply in FIG. 12, as shown at time T51 of timing diagram 1200, the comparator 260 detects that the magnitude of the offset feedback signal 1192 is substantially equal to the magnitude of the floor reference voltage 115-1. In response to detecting such a condition, the comparator 360 produces output control 165 to activate high side switch circuitry 150-1 in the power supply 100. Thus, in response to the comparator 260 detecting a condition in which a difference between a magnitude of the output voltage feedback signal 192 and a magnitude of the floor reference voltage 115 is substantially equal to a magnitude of the ramp voltage signal 1125, the switching of the high side switch circuitry 150-1 for a predetermined ON-time as indicated by the output control 165 causes the magnitude of the output voltage to increase again.

Eventually, after completion of the pulse, consumption of current by the load 118 causes the magnitude of the offset feedback signal 1192 to decrease again. At or around time T52, the comparator 260 detects that the magnitude of the offset output voltage feedback signal 1192 is substantially equal to the magnitude of the floor reference voltage 115-1 again. In response to the comparator 260 detecting this condition (such as that a difference between a magnitude of the offset output voltage feedback signal 1192 and a magnitude of the floor reference voltage 115-1 is substantially equal to the floor reference voltage 115-1, the switching of the high side switch circuitry 150-1 as indicated by output control 165 for a predetermined ON-time causes the magnitude of the output voltage to increase again. The switching of the high side switch circuitry 150-1 for predetermined ON-time causes the magnitude of the output voltage to increase again.

The cycles above are repeated to maintain the magnitude of the output voltage 191 of power supply 100 in a desired range.

Note again that techniques herein are well suited for use in power converter circuit applications such as those that include multiple phases, multiple DC-DC power converter circuits, semi-resonant DC-DC phases, buck converters, etc. However, it should be noted that embodiments herein are not limited to use in such applications and that the techniques discussed herein are well suited for other applications as well.

Based on the description set forth herein, numerous specific details have been set forth to provide a thorough understanding of claimed subject matter. However, it will be understood by those skilled in the art that claimed subject matter may be practiced without these specific details. In other instances, methods, apparatuses, systems, etc., that would be known by one of ordinary skill have not been described in detail so as not to obscure claimed subject matter. Some portions of the detailed description have been presented in terms of algorithms or symbolic representations of operations on data bits or binary digital signals stored within a computing system memory, such as a computer memory. These algorithmic descriptions or representations are examples of techniques used by those of ordinary skill in the data processing arts to convey the substance of their work to others skilled in the art. An algorithm as described herein, and generally, is considered to be a self-consistent sequence of operations or similar processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has been convenient at times, principally for reasons of common usage, to refer to such signals as bits, data, values, elements, symbols, characters, terms, numbers, numerals or the like. It should be understood, however, that all of these and similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a computing platform, such as a computer or a similar electronic computing device, that manipulates or transforms data represented as physical electronic or magnetic quantities within memories, registers, or other information storage devices, transmission devices, or display devices of the computing platform.

While this invention has been particularly shown and described with references to preferred embodiments thereof, it will be understood by those skilled in the art that various changes in form and details may be made therein without departing from the spirit and scope of the present application as defined by the appended claims. Such variations are intended to be covered by the scope of this present application. As such, the foregoing description of embodiments of the present application is not intended to be limiting. Rather, any limitations to the invention are presented in the following claims.

We claim:

1. A power supply comprising:
    a reference voltage generator operative to produce a reference voltage;
    a power converter operative to produce an output voltage to power a load as a function of the reference voltage and a ramp voltage signal that is offset with respect to the reference voltage; and
    adjustor circuitry operative to adjust a magnitude of the reference voltage based on an error signal derived from a voltage setpoint and an output voltage feedback signal, the output voltage feedback signal derived from the output voltage, adjustment of the magnitude of the reference voltage maintaining regulation of the output voltage as specified by the voltage setpoint.

2. The power supply as in claim 1, wherein the adjustor circuitry is operative to produce the error signal based on a difference between the voltage setpoint and the output voltage feedback signal.

3. The power supply as in claim 1, wherein the reference voltage is a floor reference voltage.

4. The power supply as in claim 1, further comprising:
    an amplifier;
    a switch disposed in a feedback path of the amplifier; and
    a mode controller operative to control the switch disposed in the feedback path to control the adjustor circuitry between a first mode and a second mode.

5. The power supply as in claim 4, wherein the first mode includes setting a magnitude of the reference voltage to a fixed value; and
    wherein the second mode includes varying the magnitude of the reference voltage.

6. The power supply as in claim 1, wherein the adjustor circuitry is operable to reduce a magnitude of the reference voltage in response to detecting that a magnitude of the output voltage is greater than the voltage setpoint.

7. The power supply as in claim 1, wherein the adjustor circuitry is operable to increase a magnitude of the reference voltage in response to detecting that a magnitude of the output voltage is less than the voltage setpoint.

8. The power supply as in claim 1 further comprising:
    a filter circuit operative to receive the output voltage feedback signal and produce a filtered output voltage feedback signal; and
    an error signal generator operative to produce the error signal based on a difference between the filtered output voltage feedback signal and the voltage setpoint.

9. The power supply as in claim 1, wherein the adjustor is operative to discontinue adjusting the magnitude of the reference voltage in response to detecting a polarity change in the reference voltage during operation in a diode emulation mode.

10. The power supply as in claim 1, wherein the ramp voltage signal that is offset with respect to the reference voltage is an offset ramp voltage signal, the power supply further comprising:
    a ramp generator to receive the reference votage and generate the offset ramp voltage signal, the ramp generator referenced with respect to the reference voltage to produce the offset ramp voltage signal; and
    a comparator to compare the output voltage feedback signal to the offset ramp voltage signal to control a magnitude of the output voltage.

11. The power supply as in claim 1, wherein the adjustor circuitry is operable to adjust the magnitude of the reference voltage during a condition in which the power converter is operated in a diode emulation mode.

12. The power supply as in claim 1, wherein the power converter is operated in a constant ON-time mode in which high side switch circuitry in the power converter is activated for a predetermined pulse time for each of multiple control cycles to produce the output voltage.

13. The power supply as in claim 1 further comprising:
    a mode controller to switch between i) a diode emulation mode in which the magnitude of the reference voltage is adjusted via the adjustor circuitry, and ii) a continuous conduction mode in which the magnitude of the reference voltage varies depending on a magnitude of the output voltage with respect to the voltage setpoint.

14. A method comprising:
producing a reference voltage;
producing an output voltage to power a load as a function of the reference voltage and a ramp voltage signal that is offset with respect to the reference voltage;
adjusting a magnitude of the reference voltage based on an error signal derived from a voltage setpoint and an output votage feedback signal, the output voltage feedback signal derived from the output voltage, adjustment of the magnitude of the reference voltage maintaining regulation of the output voltage as specified by the voltage setpoint.

15. The method as in claim 14 further comprising:
producing the error signal based on a difference between the voltage setpoint and the output voltage feedback signal.

16. The method as in claim 14, wherein the reference voltage is a floor reference voltage to the ramp voltage signal.

17. The method as in claim 16 further comprising;
setting a magnitude of the reference voltage to a fixed value during a first operational mode; and
varying a magnitude of the reference voltage during a second operational mode.

18. The method as in claim 14 further comprising:
reducing a magnitude of the reference voltage in response to detecting that a magnitude of the output voltage is greater than the voltage setpoint.

19. The method as in claim 14 further comprising:
increasing a magnitude of the floor reference voltage in response to detecting that a magnitude of the output voltage is less than the desired voltage setpoint.

20. The method as in claim 14 further comprising:
via a filter circuit, receiving the output voltage feedback signal and producing a filtered output voltage feedback signal; and
producing the error signal based on a difference between the filtered output voltage feedback signal and desired the voltage setpoint.

21. The method as in claim 14 further comprising:
discontinue adjusting the magnitude of the reference voltage in response to detecting a polarity change in the reference voltage during operation in a diode emulation mode.

22. The method as in claim 14, wherein the ramp voltage signal that is offset with respect to the reference voltage is an offset ramp voltage signal, method power supply, further comprising:
generating the ramp voltage signal;
offsetting the ramp voltage signal with respect to the reference voltage to produce the offset ramp voltage signal; and
comparing the output voltage feedback signal to the offset ramp voltage signal to control a magnitude of the output voltage.

23. The method as in claim 14 further comprising;
adjusting the magnitude of the reference voltage during generation of the output voltage via a diode emulation mode.

24. The method as in claim 14 further comprising:
producing the output voltage via a constant ON-time mode in which high side switch circuitry is activated for a predetermined pulse time for each of multiple control cycles.

25. The method as in claim 14 further comprising:
switching between i) a diode emulation mode in which the magnitude of the reference voltage is adjusted based on a magnitude of the error signal, and ii) a continuous conduction mode in which a magnitude of the reference voltage varies depending on a magnitude of the output voltage with respect to the setpoint voltage.

26. Computer-readable storage hardware having instructions stored thereon, the instructions, when carried out by computer processor hardware, cause the computer processor hardware to:
produce a reference voltage;
produce an output voltage to power a load as a function of the reference voltage and a ramp voltage signal that is offset with respect to the reference voltage; and
adjust a magnitude of the reference voltage based on an error signal derived from a voltage setpoint and an output voltage feedback signal, the output voltage feedback signal derived from the output voltage, adjustment of the magnitude of the reference voltage maintaining regulation of the output voltage as specified by the voltage setpoint.

27. The power supply as in claim 1 further comprising:
a comparator to compare the output voltage feedback signal to the offset ramp voltage signal to control a magnitude of the output voltage.

28. The power supply as in claim 27, wherein an output of the comparator is operative to control timing of activating switch circuitry in the power converter to produce the output voltage.

29. The power supply as in claim 1, wherein the adjustor circuitry is operable to adjust the magnitude of the reference voltage based on a difference between a magnitude of the output voltage and the voltage setpoint.

30. The power supply as in claim 1, wherein the adjustor circuitry is operable to, in a first mode in which a magnitude of the reference voltage varies, and in order to maintain regulation of the output voltage as specified by the voltage setpoint, discontinue adjusting the magnitude of the reference voltage in response to detecting occurrence of a polarity change in modifying the reference voltage from a current control cycle with respect to a prior control cycle.

31. The power supply as in claim 1, wherein the reference voltage generator is operative to clamp the offset ramp voltage signal.

32. The power supply as in claim 31, wherein clamping of the reference voltage is operable to maintain an average magnitude of the output voltage to be substantially equal to the voltage setpoint.

33. The power supply as in claim 1, wherein the magnitude of the reference voltage is adjusted to maintain an average magnitude of the output voltage to be substantially equal to the voltage setpoint.

* * * * *

UNITED STATES PATENT AND TRADEMARK OFFICE
CERTIFICATE OF CORRECTION

PATENT NO. : 11,515,787 B2
APPLICATION NO. : 16/821156
DATED : November 29, 2022
INVENTOR(S) : Keng Chen and Luca Petruzzi It is certified that error appears in the above-identified patent and that said Letters Patent is hereby corrected as shown below:

In the Claims

Column 22, Claim 10, Line 5, replace "votage" with --voltage--
Column 23, Claim 14, Line 8, replace "votage" with --voltage--
Column 23, Claim 19, Line 4, delete the word "desired"
Column 23, Claim 20, Line 6, delete the word "desired"

Signed and Sealed this
Tenth Day of January, 2023

Katherine Kelly Vidal
*Director of the United States Patent and Trademark Office*